(12) United States Patent
Yellapragada et al.

(10) Patent No.: US 12,299,133 B2
(45) Date of Patent: *May 13, 2025

(54) SYSTEMS AND METHODS FOR PRIORITIZING SECURITY FINDINGS USING MACHINE LEARNING MODELS

(71) Applicant: SecureX.AI, Inc., San Jose, CA (US)

(72) Inventors: Venkata Ramani Yellapragada, Calgary (CA); Harjinder Singh, San Jose, CA (US)

(73) Assignee: SecureX.AI, Inc., San Jose, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/902,216

(22) Filed: Sep. 2, 2022

(65) Prior Publication Data
US 2023/0205891 A1 Jun. 29, 2023

Related U.S. Application Data

(63) Continuation-in-part of application No. 17/838,800, filed on Jun. 13, 2022, now Pat. No. 12,149,555, (Continued)

(51) Int. Cl.
G06F 21/57 (2013.01)

(52) U.S. Cl.
CPC ...... G06F 21/577 (2013.01); *G06F 2221/034* (2013.01)

(58) Field of Classification Search
CPC ............. G06F 21/577; G06F 2221/034; H04L 63/1433; H04L 63/1416; G06N 20/00
See application file for complete search history.

(56) References Cited

U.S. PATENT DOCUMENTS 7,650,640 B1 1/2010 Levy
7,797,752 B1 9/2010 Vaidya et al.
(Continued)

OTHER PUBLICATIONS

Non-Final Office Action, U.S. Appl. No. 17/563,889, filed Nov. 28, 2023, 15 pages.
(Continued)

*Primary Examiner* — Aravind K Moorthy
(74) *Attorney, Agent, or Firm* — NICHOLSON DE VOS WEBSTER & ELLIOTT LLP

(57) ABSTRACT

Systems and methods for prioritizing various security findings to allow a security platform to focus on a proper subset of (e.g., the most important) one or more software application stacks of an enterprise are described. In one embodiment, a method includes generating a profile for an enterprise that indicates one or more software application stacks and a network architecture for the one or more software application stacks, determining one or more vulnerability features of the one or more software application stacks, generating one or more exploitability scores by a first machine learning model based at least in part on the one or more vulnerability features, determining a proper subset of the one or more software application stacks based at least in part on the one or more exploitability scores, determining one or more vulnerabilities of the proper subset of the one or more software application stacks and one or more vulnerabilities of the network architecture, providing the one or more vulnerabilities of the proper subset of the one or more software application stacks, the one or more vulnerabilities of the network architecture, and the profile as input to a second machine learning model, generating an inference by the second machine learning model that indicates one or more attack paths for an attacker in the proper subset of the one or more software application stacks and the network
(Continued)

architecture, and transmitting the inference to a storage location or a security software application.

21 Claims, 18 Drawing Sheets

Related U.S. Application Data which is a continuation-in-part of application No. 17/563,889, filed on Dec. 28, 2021, now Pat. No. 12,166,785.

(56) References Cited

U.S. PATENT DOCUMENTS

| | | | |
|---|---|---|---|
| 9,043,922 B1* | 5/2015 | Dumitras | G06F 21/577 726/25 |
| 9,058,492 B1 | 6/2015 | Satish | |
| 9,215,158 B1 | 12/2015 | Adogla et al. | |
| 9,544,327 B1* | 1/2017 | Sharma | G06N 20/00 |
| 9,619,772 B1 | 4/2017 | Adogla et al. | |
| 9,741,005 B1 | 8/2017 | Adogla et al. | |
| 10,009,360 B1 | 6/2018 | Todd et al. | |
| 10,114,954 B1* | 10/2018 | Bellis | G06F 21/577 |
| 10,140,453 B1 | 11/2018 | Fridakis | |
| 10,185,832 B2* | 1/2019 | Cam | G06N 7/01 |
| 10,298,599 B1 | 5/2019 | Zhang et al. | |
| 10,348,695 B1 | 7/2019 | Khassanov et al. | |
| 10,397,255 B1* | 8/2019 | Bhalotra | H04L 63/1425 |
| 10,514,905 B1* | 12/2019 | Montgomery | G06F 21/54 |
| 10,587,580 B2* | 3/2020 | Subbarayan | H04L 63/1491 |
| 10,628,129 B2* | 4/2020 | Gondalia | G06F 8/33 |
| 10,657,262 B1 | 5/2020 | Cui et al. | |
| 10,796,005 B1* | 10/2020 | Yi | G06F 16/2379 |
| 10,909,604 B1* | 2/2021 | Zappella | G06N 20/00 |
| 11,062,022 B1* | 7/2021 | Kalamkar | G06F 9/45558 |
| 11,138,317 B2* | 10/2021 | Ramasamy | G06F 21/577 |
| 11,233,815 B1* | 1/2022 | Rose | H04L 41/142 |
| 11,240,014 B1* | 2/2022 | Maganti | H04L 9/002 |
| 11,245,731 B1 | 2/2022 | Guruswamy et al. | |
| 11,283,824 B1* | 3/2022 | Berger | H04L 63/1416 |
| 11,372,969 B1 | 6/2022 | Sundahl et al. | |
| 11,470,106 B1* | 10/2022 | Lin | H04L 63/1433 |
| 11,503,061 B1* | 11/2022 | Lin | G06N 5/04 |
| 11,509,682 B1* | 11/2022 | Paget | H04L 63/1433 |
| 11,537,506 B1* | 12/2022 | Dasgupta | G06F 11/1476 |
| 11,539,738 B1 | 12/2022 | Lancioni et al. | |
| 11,556,746 B1* | 1/2023 | Dasgupta | G06N 5/04 |
| 11,558,414 B1* | 1/2023 | Nguyen | H04L 63/1433 |
| 11,563,772 B2 | 1/2023 | Doron et al. | |
| 11,568,057 B2* | 1/2023 | Handurukande | H04L 63/1433 |
| 11,651,081 B1* | 5/2023 | Powers | G06N 5/01 726/25 |
| 11,698,977 B1* | 7/2023 | Mixon-Baca | G06F 21/566 726/25 |
| 11,720,686 B1* | 8/2023 | Cross | G06F 21/577 726/25 |
| 11,736,527 B1* | 8/2023 | Joseph Durairaj | H04L 63/1433 726/1 |
| 11,757,907 B1* | 9/2023 | Berger | G06N 7/01 726/23 |
| 11,777,992 B1* | 10/2023 | Cross | H04L 63/0876 726/5 |
| 11,947,946 B1* | 4/2024 | Rao | G06F 21/577 |
| 11,983,094 B2 | 5/2024 | Downie et al. | |
| 11,989,307 B2* | 5/2024 | Hercock | G06N 3/045 |
| 12,015,630 B1* | 6/2024 | Cross | H04L 63/18 |
| 12,149,555 B2* | 11/2024 | Yellapragada | H04L 63/1416 |
| 2002/0144141 A1 | 10/2002 | Edwards et al. | |
| 2003/0033542 A1 | 2/2003 | Goseva-Popstojanova et al. | |
| 2003/0084330 A1 | 5/2003 | Tarquini et al. | |
| 2003/0154399 A1 | 8/2003 | Zuk et al. | |
| 2004/0088565 A1 | 5/2004 | Norman et al. | |
| 2005/0044418 A1 | 2/2005 | Miliefsky | |
| 2005/0273854 A1 | 12/2005 | Chess et al. | |
| 2006/0021054 A1 | 1/2006 | Costa et al. | |
| 2007/0192867 A1 | 8/2007 | Miliefsky | |
| 2007/0199050 A1* | 8/2007 | Meier | H04L 67/02 726/4 |
| 2007/0204346 A1* | 8/2007 | Meier | H04L 63/1433 726/25 |
| 2009/0113550 A1 | 4/2009 | Costa et al. | |
| 2010/0205297 A1 | 8/2010 | Sarathy | |
| 2010/0205657 A1 | 8/2010 | Manring et al. | |
| 2010/0205665 A1 | 8/2010 | Komili et al. | |
| 2010/0242082 A1 | 9/2010 | Keene et al. | |
| 2010/0242088 A1 | 9/2010 | Thomas | |
| 2010/0251363 A1 | 9/2010 | Todorovic | |
| 2010/0262688 A1 | 10/2010 | Hussain et al. | |
| 2010/0333177 A1 | 12/2010 | Donley et al. | |
| 2011/0023118 A1 | 1/2011 | Wright | |
| 2011/0067105 A1 | 3/2011 | Wolfe et al. | |
| 2011/0214157 A1 | 9/2011 | Korsunsky et al. | |
| 2011/0231564 A1 | 9/2011 | Korsunsky et al. | |
| 2012/0036580 A1 | 2/2012 | Gorny et al. | |
| 2012/0066762 A1 | 3/2012 | Todorovic | |
| 2013/0179991 A1 | 7/2013 | White et al. | |
| 2013/0227634 A1 | 8/2013 | Pal et al. | |
| 2013/0312058 A1 | 11/2013 | Thompson et al. | |
| 2013/0347052 A1 | 12/2013 | Choudrie | |
| 2014/0115703 A1 | 4/2014 | Penton et al. | |
| 2014/0157355 A1 | 6/2014 | Clancy et al. | |
| 2014/0157405 A1 | 6/2014 | Joll et al. | |
| 2014/0165204 A1 | 6/2014 | Williams et al. | |
| 2014/0189875 A1 | 7/2014 | Beskrovny et al. | |
| 2014/0201807 A1 | 7/2014 | White et al. | |
| 2014/0283136 A1 | 9/2014 | Dougherty et al. | |
| 2015/0074792 A1 | 3/2015 | Tarreau | |
| 2015/0172300 A1 | 6/2015 | Cochenour | |
| 2015/0172307 A1 | 6/2015 | Borohovski et al. | |
| 2015/0172308 A1 | 6/2015 | Borohovski et al. | |
| 2015/0350213 A1 | 12/2015 | Varadarajan et al. | |
| 2015/0381637 A1 | 12/2015 | Raff et al. | |
| 2016/0078231 A1 | 3/2016 | Bach et al. | |
| 2016/0149947 A1 | 5/2016 | Bronshtein et al. | |
| 2016/0156655 A1 | 6/2016 | Lotem et al. | |
| 2016/0180096 A1 | 6/2016 | Sharma et al. | |
| 2016/0191554 A1 | 6/2016 | Kaminsky | |
| 2016/0301676 A1 | 10/2016 | Gounares | |
| 2016/0315960 A1 | 10/2016 | Teilhet et al. | |
| 2016/0366156 A1 | 12/2016 | Kantor et al. | |
| 2017/0046518 A1 | 2/2017 | Chen et al. | |
| 2017/0111335 A1 | 4/2017 | Hibbert et al. | |
| 2017/0142072 A1 | 5/2017 | Reubenstein et al. | |
| 2017/0237778 A1* | 8/2017 | DiGiambattista | H04L 63/1433 726/1 |
| 2017/0255544 A1 | 9/2017 | Plate et al. | |
| 2017/0262387 A1 | 9/2017 | Sell | |
| 2017/0324760 A1 | 11/2017 | Gorny et al. | |
| 2017/0329979 A1 | 11/2017 | Behl et al. | |
| 2017/0337123 A1 | 11/2017 | Wang | |
| 2017/0359308 A1 | 12/2017 | Pal et al. | |
| 2018/0048674 A1 | 2/2018 | Black et al. | |
| 2018/0077188 A1 | 3/2018 | Mandyam et al. | |
| 2018/0077195 A1 | 3/2018 | Gathala et al. | |
| 2018/0115586 A1 | 4/2018 | Chou et al. | |
| 2018/0121659 A1* | 5/2018 | Sawhney | G06F 21/566 |
| 2018/0157844 A1 | 6/2018 | Duer et al. | |
| 2018/0157845 A1* | 6/2018 | Mehta | G06F 21/577 |
| 2018/0181762 A1* | 6/2018 | Poornachandran | G06F 21/575 |
| 2018/0183827 A1* | 6/2018 | Zorlular | H04L 63/1416 |
| 2018/0205755 A1* | 7/2018 | Kavi | G06F 21/577 |
| 2018/0375897 A1 | 12/2018 | Kawasaki et al. | |
| 2019/0034256 A1* | 1/2019 | Fox | G06F 12/0646 |
| 2019/0042730 A1 | 2/2019 | Yamada et al. | |
| 2019/0050230 A1 | 2/2019 | Branco et al. | |
| 2019/0050319 A1* | 2/2019 | Gondalia | G06F 11/3664 |
| 2019/0130128 A1 | 5/2019 | Khassanov et al. | |
| 2019/0164389 A1 | 5/2019 | Whytock et al. | |
| 2019/0188386 A1* | 6/2019 | Pogorelik | G06F 21/57 |
| 2019/0207978 A1 | 7/2019 | Thompson et al. | |
| 2019/0215688 A1* | 7/2019 | Zavesky | H04L 67/56 |
| 2019/0243964 A1 | 8/2019 | Shukla et al. | |

(56) References Cited

U.S. PATENT DOCUMENTS

| | | | |
|---|---|---|---|
| 2019/0258807 A1 | 8/2019 | Dimaggio et al. | |
| 2019/0306178 A1* | 10/2019 | Weizman | H04L 63/1441 |
| 2019/0327259 A1* | 10/2019 | DeFelice | G06N 3/044 |
| 2019/0327311 A1 | 10/2019 | Khassanov et al. | |
| 2019/0347424 A1* | 11/2019 | Bezzi | G06F 21/577 |
| 2019/0354765 A1 | 11/2019 | Chan et al. | |
| 2020/0057857 A1* | 2/2020 | Roytman | G06N 20/20 |
| 2020/0057858 A1* | 2/2020 | Sharma | G06F 21/563 |
| 2020/0074084 A1* | 3/2020 | Dorrans | G06F 21/577 |
| 2020/0145456 A1* | 5/2020 | Fugate | H04L 63/0464 |
| 2020/0153850 A1* | 5/2020 | Krishnan | H04L 63/101 |
| 2020/0201993 A1* | 6/2020 | Anders | G06V 40/172 |
| 2020/0259788 A1 | 8/2020 | Lukiyan et al. | |
| 2020/0259856 A1 | 8/2020 | Lukiyan et al. | |
| 2020/0327237 A1 | 10/2020 | Shakarian et al. | |
| 2020/0349259 A1 | 11/2020 | Tsai et al. | |
| 2020/0351306 A1 | 11/2020 | Nedbal et al. | |
| 2020/0364349 A1* | 11/2020 | Nunes | G06F 16/951 |
| 2020/0394335 A1 | 12/2020 | Cottrill et al. | |
| 2021/0034602 A1* | 2/2021 | Levacher | G06F 16/2365 |
| 2021/0056200 A1* | 2/2021 | Rudnik | G06F 21/53 |
| 2021/0081196 A1* | 3/2021 | Polleri | G06F 11/3452 |
| 2021/0081545 A1 | 3/2021 | Mulligan et al. | |
| 2021/0124830 A1* | 4/2021 | Dinh | G06F 21/577 |
| 2021/0126936 A1* | 4/2021 | Gerber, Jr. | H04L 63/20 |
| 2021/0136111 A1 | 5/2021 | Russinovich et al. | |
| 2021/0141899 A1 | 5/2021 | Candido et al. | |
| 2021/0152589 A1* | 5/2021 | Waplington | G06F 16/2282 |
| 2021/0160272 A1* | 5/2021 | Mehandale | H04L 63/1416 |
| 2021/0194917 A1 | 6/2021 | Ross | |
| 2021/0204116 A1 | 7/2021 | Naujok et al. | |
| 2021/0211453 A1* | 7/2021 | Cooney | G06F 16/958 |
| 2021/0218771 A1* | 7/2021 | Khouderchah | H04L 63/0263 |
| 2021/0232593 A1 | 7/2021 | Hamdi | |
| 2021/0243216 A1* | 8/2021 | Shivanna | H04L 63/1433 |
| 2021/0248241 A1* | 8/2021 | Balkanski | G06N 20/00 |
| 2021/0273969 A1 | 9/2021 | Shakarian et al. | |
| 2021/0279337 A1 | 9/2021 | Mosby et al. | |
| 2021/0342450 A1* | 11/2021 | Patel | G06F 21/577 |
| 2021/0342836 A1 | 11/2021 | Cella et al. | |
| 2021/0398225 A1 | 12/2021 | Crabtree et al. | |
| 2022/0004643 A1* | 1/2022 | Sloane | G06N 5/04 |
| 2022/0012340 A1* | 1/2022 | Rao | G06F 21/577 |
| 2022/0060501 A1* | 2/2022 | Liu | G06F 21/577 |
| 2022/0067174 A1* | 3/2022 | Gupta | G06F 21/566 |
| 2022/0070279 A1 | 3/2022 | Pang et al. | |
| 2022/0078203 A1 | 3/2022 | Shakarian et al. | |
| 2022/0083644 A1 | 3/2022 | Kulshreshtha et al. | |
| 2022/0083667 A1* | 3/2022 | Anwar | G06F 8/75 |
| 2022/0103529 A1 | 3/2022 | Johnson et al. | |
| 2022/0109685 A1 | 4/2022 | Hankins et al. | |
| 2022/0129561 A1* | 4/2022 | Shivanna | G06F 16/951 |
| 2022/0147533 A1* | 5/2022 | Shakarian | G06F 21/577 |
| 2022/0150271 A1* | 5/2022 | Shah | H04L 41/16 |
| 2022/0179978 A1* | 6/2022 | Stroila | G06N 5/04 |
| 2022/0210141 A1 | 6/2022 | Parekh et al. | |
| 2022/0237300 A1* | 7/2022 | Regev | G06F 16/245 |
| 2022/0269791 A1* | 8/2022 | Ansell | G06F 21/577 |
| 2022/0286475 A1* | 9/2022 | Mullaney | G06N 20/00 |
| 2022/0294817 A1 | 9/2022 | Parekh et al. | |
| 2022/0318674 A1* | 10/2022 | Shukla | G06N 20/00 |
| 2022/0335135 A1* | 10/2022 | McGraw | G06F 11/3684 |
| 2022/0374528 A1* | 11/2022 | Isoyama | G06F 21/577 |
| 2022/0400135 A1* | 12/2022 | Gamra | H04L 63/1433 |
| 2022/0414218 A1* | 12/2022 | Torvik | G06F 21/563 |
| 2023/0019180 A1* | 1/2023 | de Nijs | G06F 21/577 |
| 2023/0021414 A1* | 1/2023 | Kumar | G06F 21/577 |
| 2023/0041068 A1* | 2/2023 | Starin | G06F 11/3664 |
| 2023/0069738 A1* | 3/2023 | Sreedhar | H04L 63/101 |
| 2023/0120174 A1* | 4/2023 | Seck | G06F 21/566 726/25 |
| 2023/0169175 A1* | 6/2023 | Ananthapur | G06F 21/577 726/25 |
| 2023/0177023 A1* | 6/2023 | Portisch | G06N 20/00 707/781 |
| 2023/0185921 A1* | 6/2023 | Karas | G06F 21/577 726/25 |
| 2023/0208870 A1* | 6/2023 | Yellapragada | G06F 21/53 726/22 |

OTHER PUBLICATIONS

Non-Final Office Action, U.S. Appl. No. 17/838,800, filed Nov. 28, 2023, 15 pages.
ORCA Security, "SideScanning(trademark)—Inside the Engine that Powers Orca Security", SideScanning(trademark) Technical Brief, 2020, pp. 1-19.
Notice of Allowance, U.S. Appl. No. 17/563,889, filed Jul. 31, 2024, 12 pages.
Notice of Allowance, U.S. Appl. No. 17/838,800, filed Jul. 10, 2024, 12 pages.

* cited by examiner

1300

```
GENERATING AN IMAGE FOR AN ENTERPRISE THAT INDICATES ONE OR MORE SOFTWARE
APPLICATION STACKS OF A VIRTUAL INSTANCE OF A CLOUD PROVIDER FROM AN
APPLICATION PROGRAMMING INTERFACE OF THE CLOUD PROVIDER AND A NETWORK
ARCHITECTURE FOR THE ONE OR MORE SOFTWARE APPLICATION STACKS WITHOUT
INSTALLING AND UTILIZING SECURITY MONITORING SOFTWARE ON THE CLOUD PROVIDER
1302
```

```
DETERMINING ONE OR MORE VULNERABILITIES OF THE ONE OR MORE SOFTWARE
APPLICATION STACKS AND ONE OR MORE VULNERABILITIES OF THE NETWORK
ARCHITECTURE FROM THE IMAGE
1304
```

```
PROVIDING THE ONE OR MORE VULNERABILITIES OF THE ONE OR MORE SOFTWARE
APPLICATION STACKS, AND THE ONE OR MORE VULNERABILITIES OF THE NETWORK
ARCHITECTURE AS INPUT TO A MACHINE LEARNING MODEL
1306
```

```
GENERATING AN INFERENCE BY THE MACHINE LEARNING MODEL THAT INDICATES ONE
OR MORE ATTACK PATHS FOR AN ATTACKER IN THE ONE OR MORE SOFTWARE
APPLICATION STACKS AND THE NETWORK ARCHITECTURE
1308
```

```
TRANSMITTING THE INFERENCE TO A STORAGE LOCATION OR A SECURITY
SOFTWARE APPLICATION
1310
```

VULNERABILITY FEATURES 1500

VULNERABILITY CHARACTERISTICS 1502
- COMMAND EXECUTION
- EXPLOITED IN WILD
- CMD-STRING
- EXCEPTION HANDLING
- WEB APPLICATIONS FRAMEWORK

TIME-BASED EXPLOITABILITY 1504
- TIME SINCE VULNERABILITY PUBLISHED
- TIME SINCE FIRST KNOWN EXPLOIT
- TIME SINCE FIRST KNOWN MITIGATION
- TIME SINCE A RELATED ISSUE WAS EXPLOITED
- TIME SINCE THE SOFTWARE WAS EXPLOITED RECENTLY

SOURCES OF EXPLOITABILITY 1506
- EXPLOITED WIDELY
- NUMBER OF EXTERNAL REFERENCES
- NUMBER OF VENDOR LINKS
- NUMBER OF PUBLISHED ADVISORIES
- NUMBER OF DEPENDENT VULNERABILITIES

VENDOR METRICS 1508
- NUMBER OF SOFTWARE AFFECTED
- NUMBER OF SOFTWARE VERSIONS AFFECTED
- POPULARITY OF SOFTWARE AFFECTED
- NUMBER OF VENDORS AFFECTED

CODE VULNERABILITIES 1510
- NUMBER OF RELATED WEAKNESSES
- NUMBER OF INSTANCES OF WEAKNESSES BEING EXPLOITED
- NUMBER OF VULNERABILITIES ASSOCIATED WITH THE WEAKNESS

OTHER METRICS 1512
- BASE SEVERITY SCORE OF VULNERABILITY
- TYPE OF SOFTWARE (E.G., WEB OR DB)
- TYPICAL ZONE WHERE SOFTWARE IS DEPLOYED (E.G., WEB OR DMZ)
- IMPACT

1800

1802 GENERATING A PROFILE FOR AN ENTERPRISE THAT INDICATES ONE OR MORE SOFTWARE APPLICATION STACKS AND A NETWORK ARCHITECTURE FOR THE ONE OR MORE SOFTWARE APPLICATION STACKS

1804 DETERMINING ONE OR MORE VULNERABILITY FEATURES OF THE ONE OR MORE SOFTWARE APPLICATION STACKS

1806 GENERATING ONE OR MORE EXPLOITABILITY SCORES BY A FIRST MACHINE LEARNING MODEL BASED AT LEAST IN PART ON THE ONE OR MORE VULNERABILITY FEATURES

1808 DETERMINING A PROPER SUBSET OF THE ONE OR MORE SOFTWARE APPLICATION STACKS BASED AT LEAST IN PART ON THE ONE OR MORE EXPLOITABILITY SCORES

1810 DETERMINING ONE OR MORE VULNERABILITIES OF THE PROPER SUBSET OF THE ONE OR MORE SOFTWARE APPLICATION STACKS AND ONE OR MORE VULNERABILITIES OF THE NETWORK ARCHITECTURE

1812 PROVIDING THE ONE OR MORE VULNERABILITIES OF THE PROPER SUBSET OF THE ONE OR MORE SOFTWARE APPLICATION STACKS, THE ONE OR MORE VULNERABILITIES OF THE NETWORK ARCHITECTURE, AND THE PROFILE AS INPUT TO A SECOND MACHINE LEARNING MODEL

1814 GENERATING AN INFERENCE BY THE SECOND MACHINE LEARNING MODEL THAT INDICATES ONE OR MORE ATTACK PATHS FOR AN ATTACKER IN THE PROPER SUBSET OF THE ONE OR MORE SOFTWARE APPLICATION STACKS AND THE NETWORK ARCHITECTURE

1816 TRANSMITTING THE INFERENCE TO A STORAGE LOCATION OR A SECURITY SOFTWARE APPLICATION

FIG. 18

SYSTEMS AND METHODS FOR PRIORITIZING SECURITY FINDINGS USING MACHINE LEARNING MODELS

CROSS REFERENCE TO RELATED APPLICATIONS

This application is a Continuation-in-Part of U.S. patent application Ser. No. 17/838,800, filed on Jun. 13, 2022, which is a Continuation-in-Part of U.S. patent application Ser. No. 17/563,889, filed on Dec. 28, 2021, each of which is herein incorporated by reference in its entirety.

BACKGROUND

As the world increasingly relies on computers and computer networks, there is an increasing opportunity to secure the applications running on those computers and secure the networks coupling those computers together. Such security is to prevent, detect, and monitor unauthorized access, misuse, modification, or denial of a computer and computer network.

BRIEF DESCRIPTION OF THE DRAWINGS

The disclosure may best be understood by referring to the following description and accompanying drawings that are used to illustrate embodiments of the disclosure. In the drawings:

FIG. 13 is a flow diagram illustrating operations of a method for predictive analysis of potential attack patterns based on contextual security information including an image according to some embodiments.

FIG. 15 is a block diagram illustrating vulnerability features according to some embodiments.

FIG. 18 is a flow diagram illustrating operations of a method for generating one or more exploitability scores by a first machine learning model based at least in part on an input of one or more vulnerability features of one or more software application stacks, determining a proper subset of the one or more software application stacks based at least in part on the one or more exploitability scores, and generating a predictive analysis of potential attack patterns by a second machine learning model based at least in part on an input of the proper subset of the one or more software application stacks according to some embodiments.

DETAILED DESCRIPTION

Figure 1:
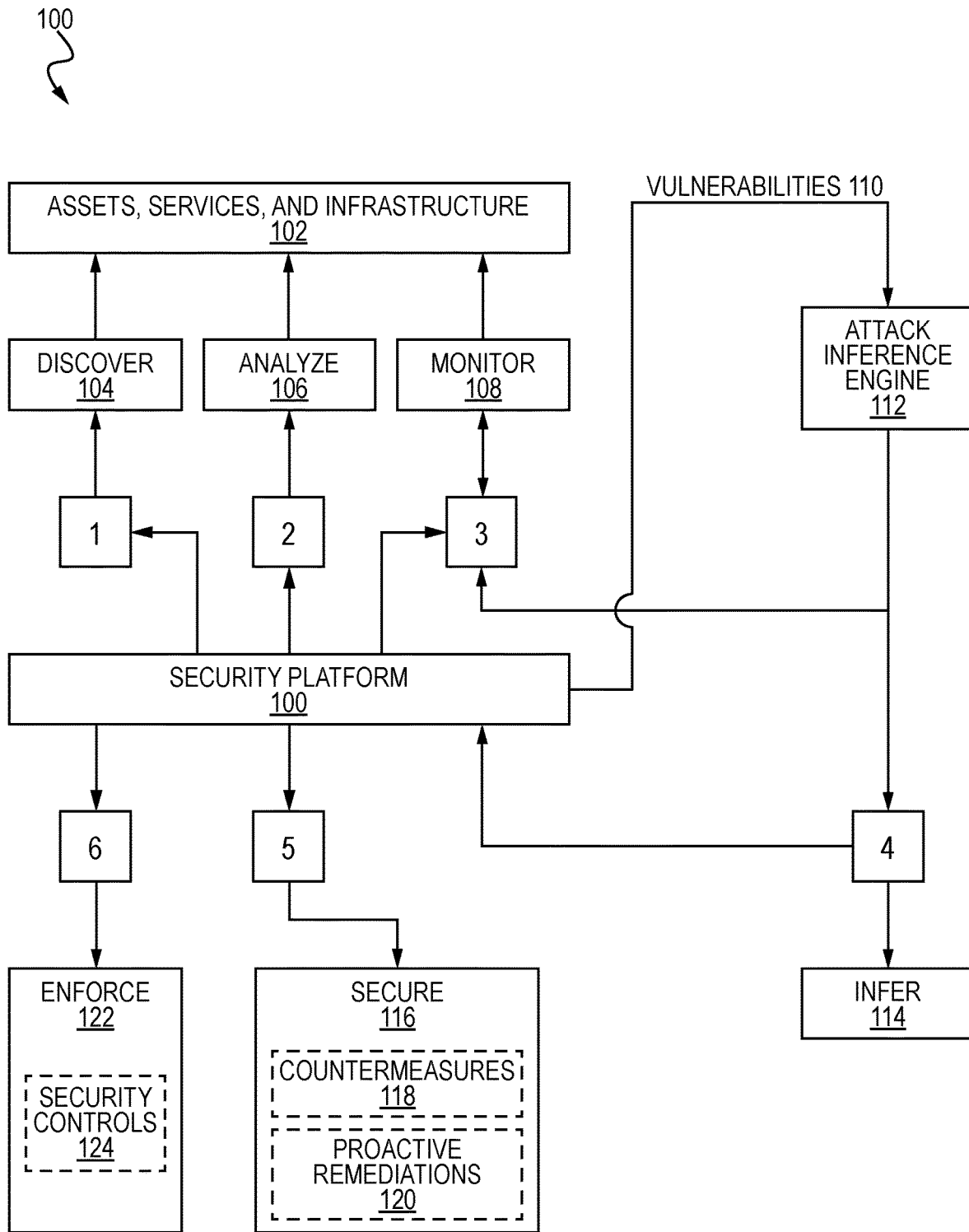
FIG. 1 is a block diagram of a security platform according to some embodiments.

The present disclosure relates to methods, apparatus, systems, and non-transitory computer-readable storage media for predictive analysis of potential attack patterns based on contextual security information. In certain enterprises and/or public cloud environments, there are several assets, applications, servers, services (e.g., software application stack(s)) which are connected through various networks. In turn, there could arise various vulnerabilities (e.g., including weaknesses and/or misconfigurations) related to these resources.

In certain embodiments, the information related to these aspects is retrieved from various asset management and security tools for correlating the data. In certain embodiments, the correlation provides the entire enterprise architecture, which helps identify the most critical security issues and components and helps prioritize correcting those issues. In certain embodiments, the security information and infrastructure information are used to predict potential attack paths (e.g., and patterns) that an attacker could employ to exploit the various security shortcomings. In certain embodiments herein, machine learning methods and algorithms are applied to predict potential attacks (e.g., attack paths) based on security knowledge and the communication channels between the entities. In certain embodiments herein, methods are also employed to propose remediation and mitigation actions to prevent the exploitation.

Detecting vulnerabilities (e.g., including weaknesses and/or misconfigurations) in an information technology (IT) environment is an effective way to stop cyberattacks before they manifest. Embodiments herein correlate security information with activity in a computing environment and use that to infer potential attack vectors. In certain embodiments, the attack vectors are correlated with the network architecture in an enterprise, and thus help infer potential attack paths. Embodiments herein are directed to a mechanism for correlating information about assets, applications, servers, and services discovered and their associated vulnerabilities (e.g., including weaknesses and misconfigurations) in a computing environment to predict attack paths and/or attack patterns. In certain embodiments, ongoing activity is analyzed to look for anomalies, suspicious events, and security alerts to detect attack activity. Certain embodiments herein provide remediation and mitigation actions to prevent exploitation based on the predictions made and ongoing activity. Certain embodiments herein calculate the risk associated with the assets and applications using the employed parameters to prioritize the assets and applications that are to be fixed, e.g., prioritized to be fixed. In certain embodiments, machine imaging methods are utilized to identify vulnerabilities in public cloud assets.

Certain embodiments herein perform operations including generating a profile for an enterprise that indicates one or more software application stacks and a network architecture for the one or more software application stacks; determining one or more vulnerabilities of the one or more software application stacks and one or more vulnerabilities of the network architecture; providing the one or more vulnerabilities of the one or more software application stacks, the one or more vulnerabilities of the network architecture, and the profile as input to a machine learning model; generating an inference by the machine learning model that indicates one or more attack paths for an attacker in the one or more software application stacks and the network architecture; and transmitting the inference to a storage location or a security software application. These embodiments are an improvement to the functioning of a computer network, namely, network security. The embodiments herein improve the ability to infer one or more attack paths in the software application stack(s) and network architecture for the software application stack(s) (e.g., of a business), with the improvement including using a specifically trained machine learning model to perform the inference on an input of (i) the one or more vulnerabilities of the one or more software application stacks, and (ii) the one or more vulnerabilities of the network architecture.

Certain embodiments herein perform operations including generating a profile for an enterprise that indicates one or more software application stacks and a network architecture for the one or more software application stacks; determining one or more vulnerabilities of the one or more software application stacks and one or more vulnerabilities of the network architecture; determining one or more anomalies within network traffic of the network architecture; providing the one or more vulnerabilities of the one or more software application stacks, the one or more vulnerabilities of the network architecture, the one or more anomalies within network traffic of the network architecture, and the profile as input to a machine learning model; generating an inference by the machine learning model that indicates one or more attack paths for an attacker in the one or more software application stacks and the network architecture; and transmitting the inference to a storage location or a security software application. These embodiments are an improvement to the functioning of a computer network, namely, network security. The embodiments herein improve the ability to infer one or more attack paths in the software application stack(s) and network architecture for the software application stack(s) (e.g., of a business), with the improvement including using a specifically trained machine learning model to perform the inference on an input of (i) the one or more vulnerabilities of the one or more software application stacks, (ii) the one or more vulnerabilities of the network architecture, and (iii) the one or more anomalies within network traffic of the network architecture.

In certain embodiments, the IT environment includes a plurality of applications (e.g., programs) (e.g., software) that each perform a specific task and typically run on an asset, for example, where an asset is a computer, virtual computer, computing device, servers, networking device, infrastructure device, security appliance, mobile device, or similar. In certain embodiments, the IT environment includes one or more business software applications, for example, a set of applications that help carry out a business task for an enterprise, e.g., billing, user management, etc. In certain embodiments, the IT environment includes a service (e.g., network service), e.g., a program running at the application layer of an Open Systems Interconnection (OSI) model that is listening on a certain port and provides certain functionalities such as data storage, data retrieval, presentation, communication, etc. Examples of services are a Hyper Text Transfer Protocol (HTTP) service (e.g., for communication between clients and web servers), Domain Name System (DNS) service (e.g., by which Internet domain names and addresses are tracked and regulated, e.g., as defined by Internet Engineering Task Force (IETF) Request for Comments (RFC) 1034 and/or other related RFCs), and Server Message Block (SMB) service (e.g., for providing file sharing, network browsing, printing, and inter-process communication (IPC) over a network).

In certain embodiments, a vulnerability is a security issue (e.g., in assets and/or applications) that can be exploited by a threat actor. In certain embodiments, a vulnerability includes a hardware and/or software error that can be exploited by a threat actor. In certain embodiments, a vulnerability includes a misconfiguration (e.g., a lack of security control(s) or error(s) when configuring the security controls for a server or service) that can be exploited by a threat actor. In certain embodiments, the security issue is the occurrence of a security event, e.g., that causes a security alert and/or security anomaly. Non-limiting examples of security events include a spike in network traffic, scanning activity, or a change in a security group that allows previously disallowed traffic. In certain embodiments, the assets and/or applications are grouped into tiers, e.g., where a tier is a collection of assets and/or applications that provide similar functionality and form part of the business application. For example, a web tier is a collection of web servers and the web services which provide web access functionality for a business application. In certain embodiments, the assets and/or applications includes one or more virtual machines (VMs), e.g., where a VM is a virtual or software-defined computer running within physical servers as code. In a public cloud environment, this may include VMs, instances, serverless functions, containers running in various settings under the public cloud environment, etc. In certain embodiments, the assets and/or applications includes a virtual cloud asset, e.g., where the virtual cloud asset is VM running in a public cloud environment (e.g., a cloud service provider that has a plurality of customers).

The below sections include (i) predictive analysis of potential attack paths based on contextual vulnerability information, (ii) methods for vulnerability assessment for cloud assets using imaging methods, (iii) methods for prioritizing security findings using machine learning models, (iv) risk scoring for applications based on historical, predictive, and inherent factors, and (v) methods for proposing counter measures for security vulnerabilities using contextual and attack prediction patterns.

(I) Predictive Analysis of Potential Attack Paths Based on Contextual Vulnerability Information Certain embodiments herein are directed to predictive analysis of potential attack paths based on contextual vulnerability information.

In certain embodiments of an enterprise and/or public cloud environment, information about the assets, applications, and services is retrieved from various asset management and security tools. In certain embodiments, network communications between the various entities are used to build a network architecture map. Additionally, services and applications might have vulnerabilities in that environment. In certain embodiments, the services and the communication channels could have misconfigurations. In certain embodiments, weaknesses are identified during the development stage by building the control and data flows in the application and identifying security issues in such flows. In certain embodiments, this information is used to predict potential attack patterns that an attacker could employ to exploit the weakness in the control and data flows. In certain embodiments, various methods and algorithms are applied to predict potential attack paths based on knowledge of communication channels between the entities.

FIG. 1 is a block diagram of a security platform 100 according to some embodiments. Depicted security platform 100 is to monitor the computing assets, services, and/or infrastructure 102 of an enterprise, e.g., an organization rather than individual users. Example organizations include businesses, schools, interest-based user groups, clubs, charities, governments, etc.

In certain embodiments, the (e.g., computer implemented) security platform 100 performs one or more of the disclosed operations to provide the functionalities described herein, e.g., in response to a request to perform security operations on the computing assets, services, and/or infrastructure 102.

In certain embodiments, security platform 100 is to perform a discovery at discover 104 (e.g., as shown by the square labeled with a "1") to determine the assets, services, and/or infrastructure 102 (e.g., one or more software application stacks and a network architecture of the one or more software application stacks). In certain embodiments, security platform is to perform an analysis at analyze 106 (e.g., as shown by the square labeled with a "2") to correlate the discovered information from 104 and/or identify one or more business applications. For example, by using the routing, asset tags, access control lists, control flows, data flows, and/or business flows, the business application is identified. In certain embodiments, security platform 100 is to perform continuous monitoring at monitor 108 (e.g., as shown by the square labeled with a "3") to determine any changes to the assets, services, and/or infrastructure 102 (e.g., any changes to the one or more software application stacks and a network architecture of the one or more software application stacks). In certain embodiments, security platform 100 is to generate one or more indication of vulnerabilities 110 in assets, services, and/or infrastructure 102, e.g., generated from the discover 104, analyze 106, and monitor 108. In certain embodiments, security platform 100 (e.g., attack inference engine 110 thereof) is to perform an inference at infer 114 (e.g., as shown by the square labeled with a "4") to determine potential attack path(s), risk score(s), and/or compliance status(es). In certain embodiments, security platform 100 is to determine one or more security solutions to the attack path(s) at secure 116 (e.g., as shown by the square labeled with a "5") (e.g., to determine countermeasure(s) 118 and/or practice remediation(s) 120). In certain embodiments, security platform 100 is to enforce (e.g., a proper subset of) at enforce 122 (e.g., as shown by the square labeled with a "6") the one or more security solutions, e.g., via modification of security control(s) 124, e.g., patching the systems.

In certain embodiments, during the "discover" 104 phase, information about the various assets, services, infrastructure details (e.g., network name, network zone, subnets, etc.) is collected. In certain embodiments, this is done by connecting to the application programing interface (API) of various tools. In certain embodiments, the information indicated the attributes of an asset such as operating system (OS) information, Internet Protocol (IP) address, network zone, and/or region. In certain embodiments, the information related to the network connections of the asset is obtained as part of this process. In certain embodiments, such information of the network connections is later employed to identify one or more business applications (e.g., software stack). In certain embodiments, information related to the deployed software in those assets is obtained as well. This is used to classify the asset as belonging to a certain network type in certain embodiments. In certain embodiments, the types of network assets (e.g., the network architecture) includes a firewall, load balancer, web application endpoint, database (DB) endpoint, etc. In certain embodiments, the information retrieved is related to the vulnerabilities (e.g., including weaknesses and/or misconfigurations) in the various assets or in the services running on those assets.

In certain embodiments, during the "analyze" 106 phase, the collected information is correlated (e.g., and the business application(s) are identified). In certain embodiments, the correlation is based on certain features associated with the assets or tags provided by the consumer of the product. Example of features are the services port numbers, the type of network connections made to other assets, the network zone of the asset, the software running on the asset, and/or access controls related to the asset. In certain embodiments, for tags, the consumer is provided the ability to tag certain assets to belong to a business application. In certain embodiments, the network architecture of the business application is analyzed by gathering the asset data and analyzing the interaction between the various assets. In certain embodiments, one or more machine learning models are employed to discover the network architecture of the business application, e.g., as discussed below.

In certain embodiments, the "monitor" 108 phase is similar to the "discover" 104 phase but is done continually. In certain embodiments, the frequency of information gathering is based on the type of tool. For example, the asset data might be gathered every 24 hours in certain embodiments. In certain embodiments, static scans and vulnerability scans are scheduled (e.g., by a consumer) (e.g., every week), and the frequency is scheduled as per the tool setup. In certain embodiments, tools such as firewalls and intrusion detection systems provide logs more frequently, and hence this information is collected at more frequent intervals. In certain embodiments, in addition, periodically the configurations of the various tools are checked to adjust the frequency of scans accordingly. In certain embodiments, the consumer (e.g., of the security platform 100) provides access to network traffic or network traffic metrics of their environment, e.g., such that the frequency is about every minute or about every 5 minutes. In certain embodiments, the access provided depends on the environment where the assets are deployed. Examples of network traffic access is through a switched port analyzer (SPAN) port, test access port (TAP) port, and/or traffic mirroring. Examples of network traffic metrics are virtual private cloud (VPC) flow logs, metrics from security information and event management (SIEM) tools, and/or reports from other cybersecurity tools. In certain embodiments, certain anomalies are detected by the security system which can be used to suggest ad-hoc monitoring to be triggered.

In certain embodiments, during the "infer" 114 phase, all the collected information (e.g., collected by vulnerability detectors 500 in FIG. 5) is analyzed. In the depicted embodiment, the attack inference engine 112 performs the inference(s). In certain embodiments, the collected information includes vulnerabilities (e.g., and weaknesses and/or misconfigurations) information. In certain embodiments, the collected information (e.g., vulnerabilities information) that was discovered is mapped to the assets, services, and/or applications in a business application. In certain embodiments, a network architecture map previously discovered is employed to infer potential attack paths. In certain embodiments, one or more machine learning models are employed to predict the next attack sequence in an attack pattern (e.g., as discussed below). In certain embodiments, this contextual information is used to calculate risk scores (e.g., between 1 and 10, or a corresponding percentage), for example, for assets and business applications. In certain embodiments, the compliance status (e.g., a binary "yes" for compliance or binary "no" for non-compliance) of assets is analyzed and presented (for example, to a user of the security platform 102, e.g., an IT administrator).

In certain embodiments, the "secure" 118 phase uses the attack paths and exploitability information to proactively propose countermeasures and/or remediations. In certain embodiments, these measures, if implemented, are to prevent/mitigate potential attack scenarios. In certain embodiments, the vulnerability (e.g., and weakness/misconfiguration) information is mapped to standard weakness (e.g., and/or vulnerability) identifiers such as CWE (Common Weakness Enumeration) and CVE (Common Vulnerability Enumeration). In certain embodiments, these standard identifiers provide suggested remediations, which are mapped by the security platform 100 based on the network architecture and relevant specifics are added to the remediations. For example, for a "Blind SQL injection" weakness, a standard remediation is to introduce input validation in the software service in certain embodiments. However, implementing this remediation involves the development cycle for the software, which would require time. Instead, if the security platform 100 has determined that a web application firewall (WAF) is part of the network architecture, the remediation proposed is to have a rule that could be implemented through the WAF tool to prevent exploitation while the permanent fix is being developed and tested.

In certain embodiments, the countermeasures 118 and/or remediations 120 are enforced through the various security controls 124 and/or tools existing in a particular environment. These could range from firewall rules, access control list (ACL) rules, WAF rules, and/or intrusion prevention system (IPS) signatures. As in the previous example, where a WAF rule is proposed to prevent a SQL injection attack, in certain embodiments herein the consumer is provided the option by the security platform 100 to apply the rule. In certain embodiments, the rule is created and applied through the API interaction of the security platform 100 and the WAF tool. e.g., with this reducing one additional step for consumers to separately access the WAF in order to enforce the rule.

Figure 2:
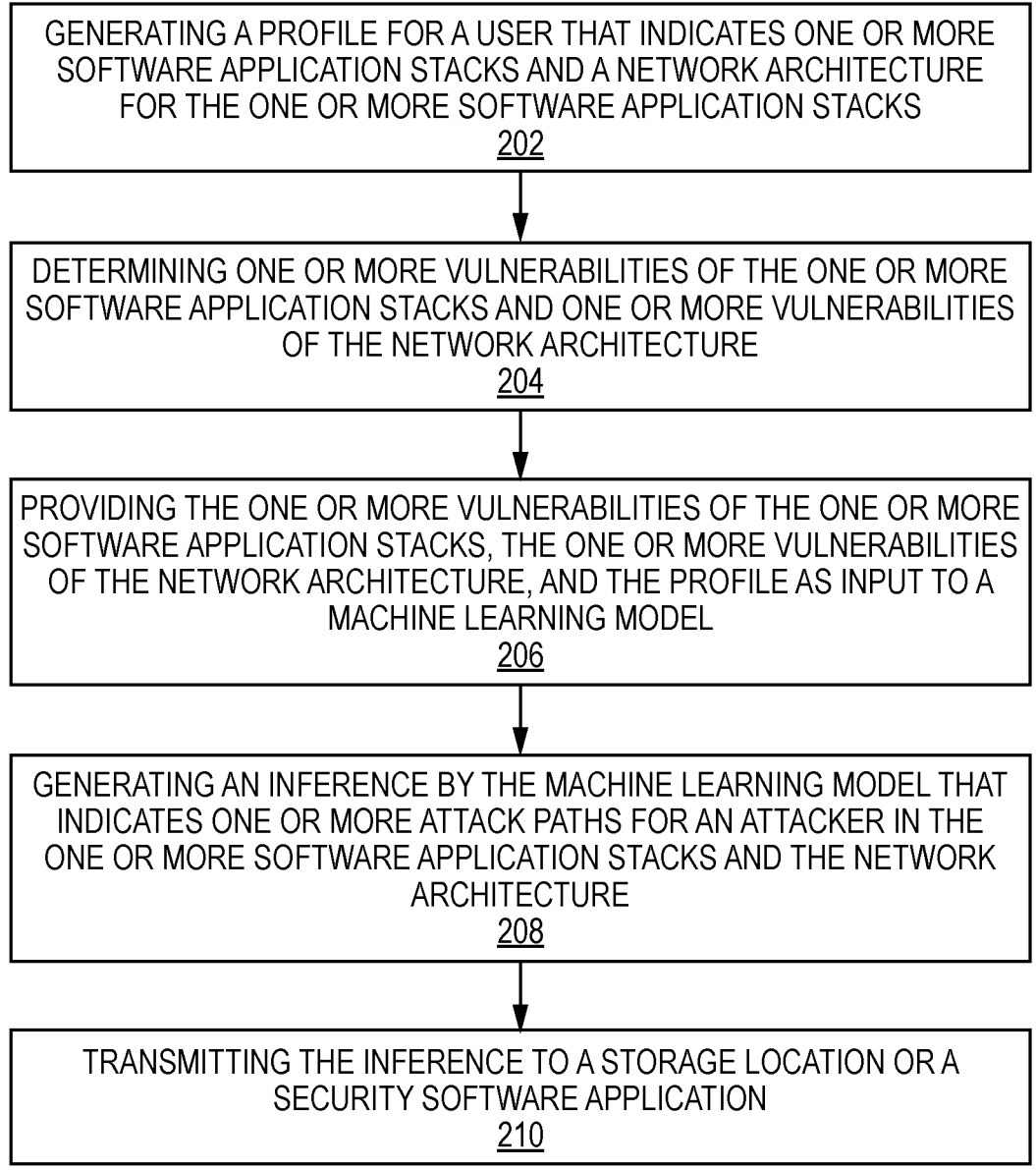
FIG. 2 is a flow diagram illustrating operations of a method for predictive analysis of potential attack patterns based on contextual security information according to some embodiments.

FIG. 2 is a flow diagram illustrating operations 200 of a method for predictive analysis of potential attack patterns based on contextual security information according to some embodiments. Some or all of the operations 200 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 200 are performed by a security platform (or a component thereof) of the other figures.

The operations 200 include, at block 202, generating a profile for an enterprise that indicates one or more software application stacks and a network architecture for the one or more software application stacks. The operations 200 further include, at block 204, determining one or more vulnerabilities of the one or more software application stacks and one or more vulnerabilities of the network architecture. The operations 200 further include, at block 206, providing the one or more vulnerabilities of the one or more software application stacks, the one or more vulnerabilities of the network architecture, and the profile as input to a machine learning model. The operations 200 further include, at block 208, generating an inference by the machine learning model that indicates one or more attack paths for an attacker in the one or more software application stacks and the network architecture. The operations 200 further include, at block 210, transmitting the inference to a storage location or a security software application.

Business Application Discovery

In certain embodiments, the first operation to analyze the security posture of an enterprise is to obtain information about the various business applications running in the environment. The application could be deployed across several assets spread across various IT environments and/or servers and could include several services that together achieve the business functionality. Thus, this provides insights into the criticality of the business applications and in turn helps prioritize security assessments and remediations. In certain embodiments, the network connectivity between the various components of the application helps predict the attack path(s). In certain embodiments, risk score calculations including, but not limited to, various factors such as deployment mode, impact on confidentiality, integrity, and availability for the business application, prediction of attack and lateral movement across the application, interaction with other application(s) helps a security officer make critical security decisions that they could not make in their head or with just pen and paper. In certain embodiments, a critical step in business application discovery is to correlate the data obtained from a plurality of sources. An example process for business application discovery is discussed below in reference to FIG. 3 and an example of a discovered business application is discussed below in reference to FIG. 4.

Figure 3:
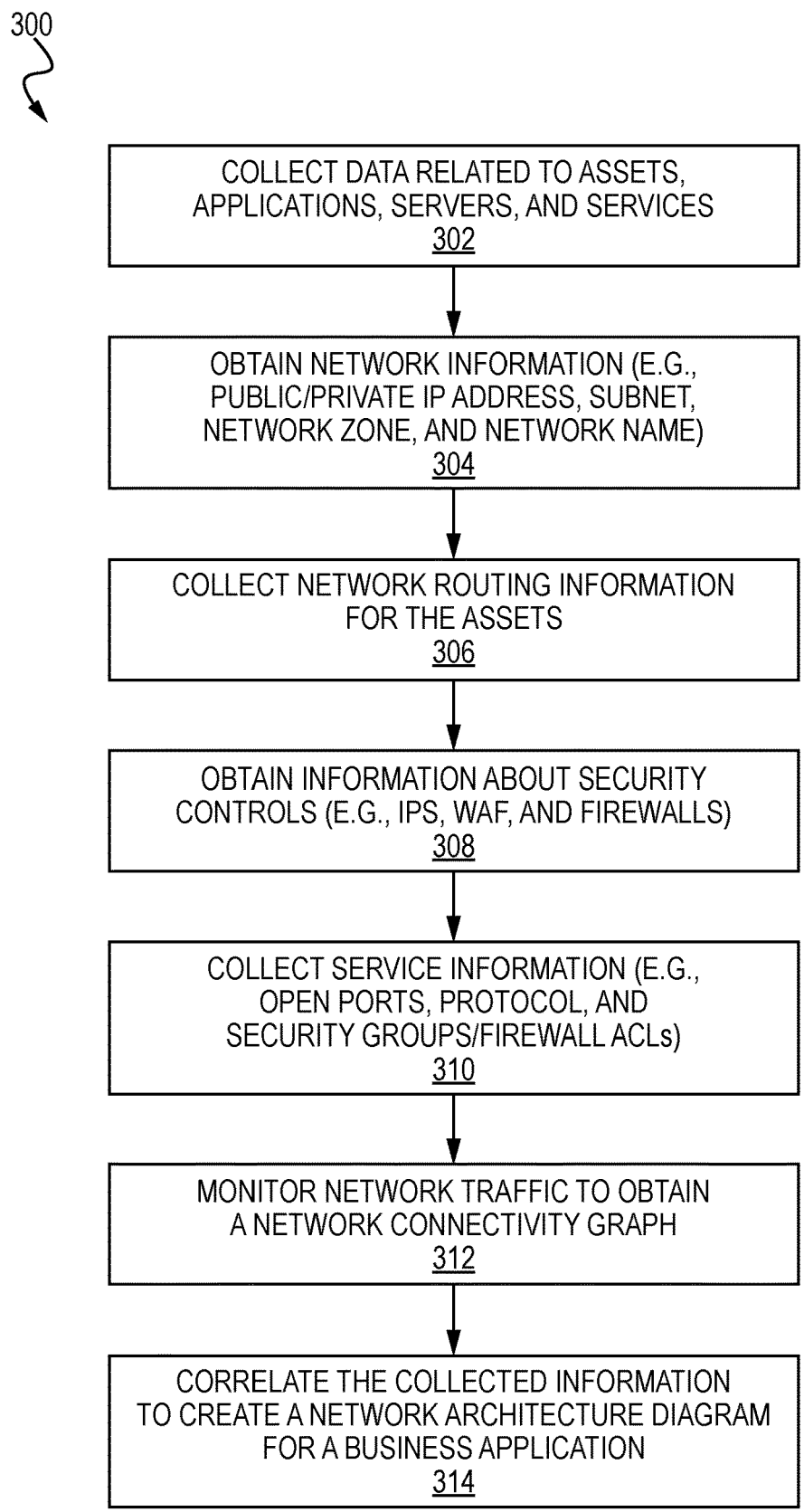
FIG. 3 is a flow diagram illustrating operations of a method for discovering one or more business application according to some embodiments.

FIG. 3 is a flow diagram illustrating operations 300 of a method for discovering one or more business application according to some embodiments. Some or all of the operations 300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by a security platform (or a component thereof) of the other figures.

The operations 300 include, at block 302, collecting data related to assets, applications, servers, and services. The operations 300 further include, at block 304, obtaining network information (e.g., public/private IP address, subnet, network zone, and/or network name). The operations 300 further include, at block 306, collecting network routing information for the assets. The operations 300 further include, at block 308, obtaining information about security controls (e.g., IPS, WAF, and/or firewall(s)). The operations 300 further include, at block 310, collecting service information (e.g., open ports, protocol, and/or security groups/firewall ACLs). The operations 300 further include, at block 312, monitoring network traffic to obtain a network connectivity graph. The operations 300 further include, at block 314, correlating the collected information to create a network architecture diagram for the business application(s).

In certain embodiments, business application discovery operations include one or more of the following. In certain embodiments, the data related to assets is retrieved from tools and sources existing in a computing environment. In certain embodiments, the related network information (e.g., data center, network zone, network name, subnet, and/or public/private IP addresses) associated with the assets is retrieved as well. In certain embodiments, tools such as configuration management database (CMDB), public cloud APIs, and/or cloud security posture management (CSPM) are used for this purpose. In certain embodiments, this information is retrieved through the APIs of these tools, databases provided by these tools, or in some cases files storing data from these tools. In certain embodiments, the routing information is obtained for these assets which is used to build the routing structure between the assets. In certain embodiments, information such as security groups and/or firewall ACLs is used to build the connectivity information between the cloud assets. In certain embodiments, tools such as public cloud APIs, firewall logs, ACL logs, and/or router data is used to build this information.

In certain embodiments, if security control (e.g., IPS, WAF, and/or firewall) information is present in the environment, the related information such as network zone and/or network name is retrieved from the tools. In certain embodiments, this information is collected through logging tools such as SIEM tools, IT tools (e.g., CMDB), or using public cloud APIs.

In certain embodiments, information about the network services such as the ports listening on, the protocol used, and/or the software that the service is using, is obtained from vulnerability detectors (e.g., vulnerability scanners). In certain embodiments, for public cloud assets, the security platform uses the imaging method discussed below to obtain the service information. In certain embodiments, the imaging method can also help retrieve information about any containers and container services. In certain embodiments, in the case of deployment using a container-orchestration system (e.g., Kubernetes), container service information is obtained by using the APIs.

In certain embodiments, using the service information and the ports they are listening on, assets are grouped into tiers. Further, the corresponding software information could be used to classify the asset and service belonging to a layer of the business application. For example, all web servers listening on certain ports (e.g., ports 80, 8080, and 443) could be grouped into a web tier/presentation layer. For example, port 5432 representing a database could belong to database tier/database layer. Similarly, all business logic services could be grouped into the application tier/business layer. The business application layer thus corresponds to the layered architecture software design employed by entities to handle various business needs in certain embodiments.

In certain embodiments, a business application is thus made of various tiers/layers comprising of apps, assets, services, and software stacks. In addition, there could be certain common services such as DNS, NTP, etc., which are essential for the functioning of the business application. Such services could be categorized under the common tier/layer.

In certain embodiments, a private cloud (e.g., private data center) resides on a company's own infrastructure, for example, firewall protected and physically secured such there is no sharing of infrastructure, no multitenancy issues, and/or zero latency for local applications and users. In certain embodiments, a public cloud alleviates the responsibility for management of the infrastructure since it is by definition hosted by a public cloud provider, for example, in and infrastructure-as-a-service (IaaS) public cloud deployment, enterprise data and application code reside on the cloud service provider (CSP) servers, which can be shared in a multi-tenant environment with other organizations' IT resources.

In certain embodiments, the business application(s) are classified based on the code base they reside at. For example, all the functionalities of a business application might be in a single folder (e.g., Git repository) of a distributed version control system. However, the deployment of the applications might be spread across various assets, network zones, environments (such as public cloud, private cloud, and/or on-premises (on-prem)) and geographies. In certain embodiments, business application information is retrieved using code repositories and/or by using certain tools (e.g., secure code analysis tool (SAST)) which work on code repositories.

Figure 4:
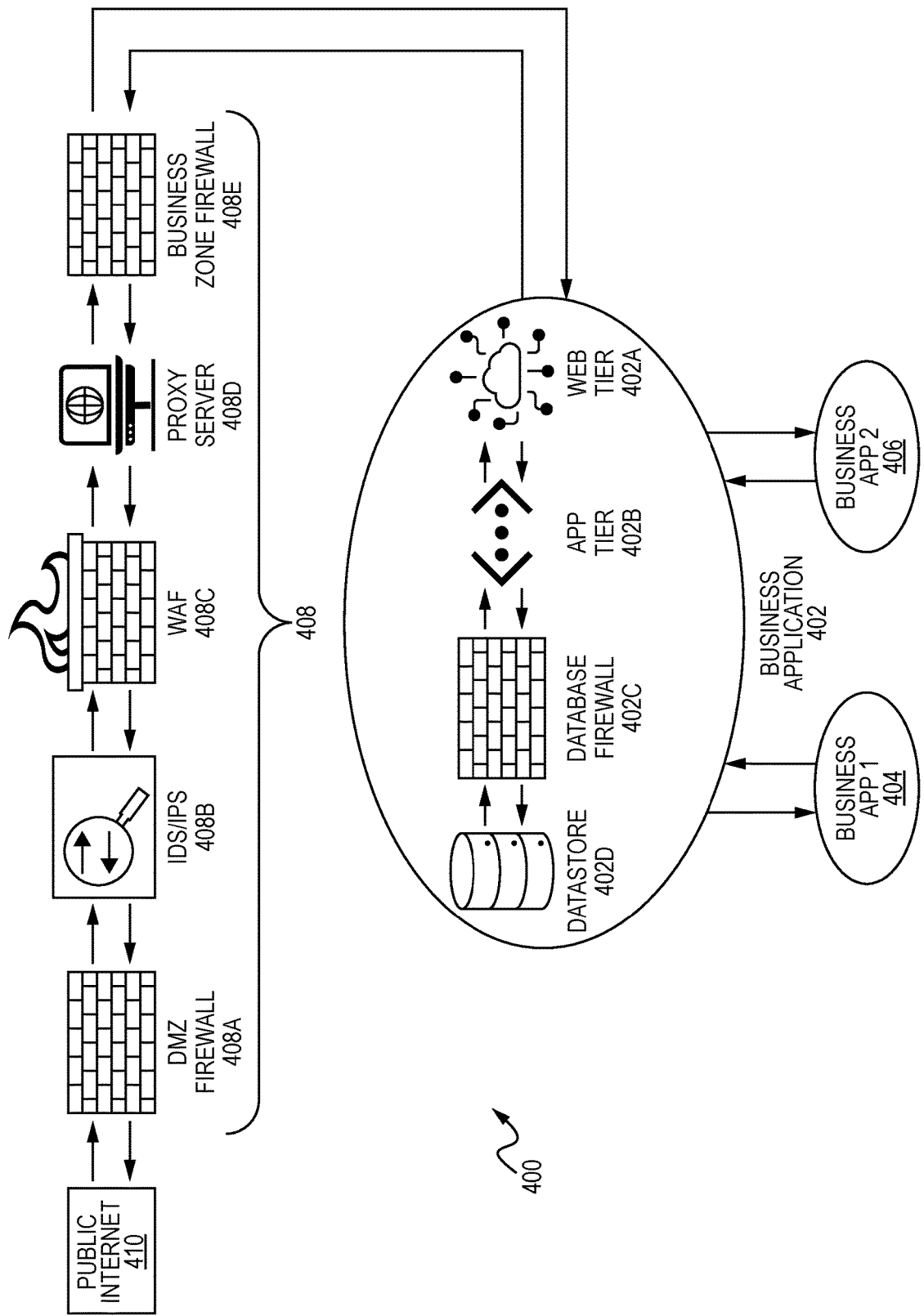
FIG. 4 is a block diagram illustrating a network architecture having a plurality of business applications according to some embodiments.

In certain embodiments, this data (e.g., including network activity) is used to generate a network architecture of the business application, for example, as shown in business application 402 in FIG. 4. In certain embodiments, the network activity is obtained either through network taps in an on-prem environment, or through flow logs in public cloud environments. In certain embodiments, the information provided by these sources includes source IP address, destination IP address, source port, destination port, and/or if connections were allowed or blocked. In certain embodiments, this data is used to further build network connectivity between the assets in a business application and between various business apps.

In certain embodiments, using the various information gathered at several levels, such as about the assets, apps, services and the network interactions, a model for the network architecture of a business application is built, e.g., as shown graphically in FIG. 4.

FIG. 4 is a block diagram illustrating a network architecture 400 having a plurality of business applications according to some embodiments. In certain embodiments, security platform 100 is to generate a graphical user interface (GUI) illustrating the network architecture 400. In certain embodiments, the network architecture 400 indicates a business application 402, e.g., a business application having a web tier 402A, an application tier 402B, a firewall 402C, and a database 402D (e.g., of the one or more software application stacks forming the business application 402). In certain embodiments, the network architecture 400 indicates one or more additional business applications 404 and/or 406, for example, that perform service(s) for the business application 402.

In certain embodiments, the network architecture 400 indicates the components 408 coupling the business application(s) (e.g., business application 402) to the public internet 410. In certain embodiments, the components 408 include one or more of a (e.g., "DMZ") firewall 408A (e.g., between a public network (e.g., internet 410) and private network (e.g., 408, 402, 404, and 406), an intrusion detection system (IDS) and/or intrusion prevention system (IPS) 408B, a web application firewall (WAF) 408C, a proxy server 408D (e.g., to relay Hypertext Transfer Protocol (HTTP) requests to business application(s) protected by a firewall, and a business zone firewall 408E.

In certain embodiments, a particular network architecture is assigned to a profile for a particular set of assets, services, and/or infrastructure 102 in FIG. 1.

Attack Path Prediction

Certain embodiments herein utilize the determined network architecture along with one or more identified vulnerabilities to infer a potential attack, e.g., instead of merely presenting each vulnerability for a decision to be made on, which is not practically performed by a human being.

In certain embodiments, after determining, the next step to securing an enterprise is to determine and predict the impacts of attacks and/or the potential paths an attack could (e.g., laterally) move in the context of a business application. This helps not only to understand the criticality of assets and applications in an enterprise but also identifies the attack blind spots in a networked architecture.

Figure 5:
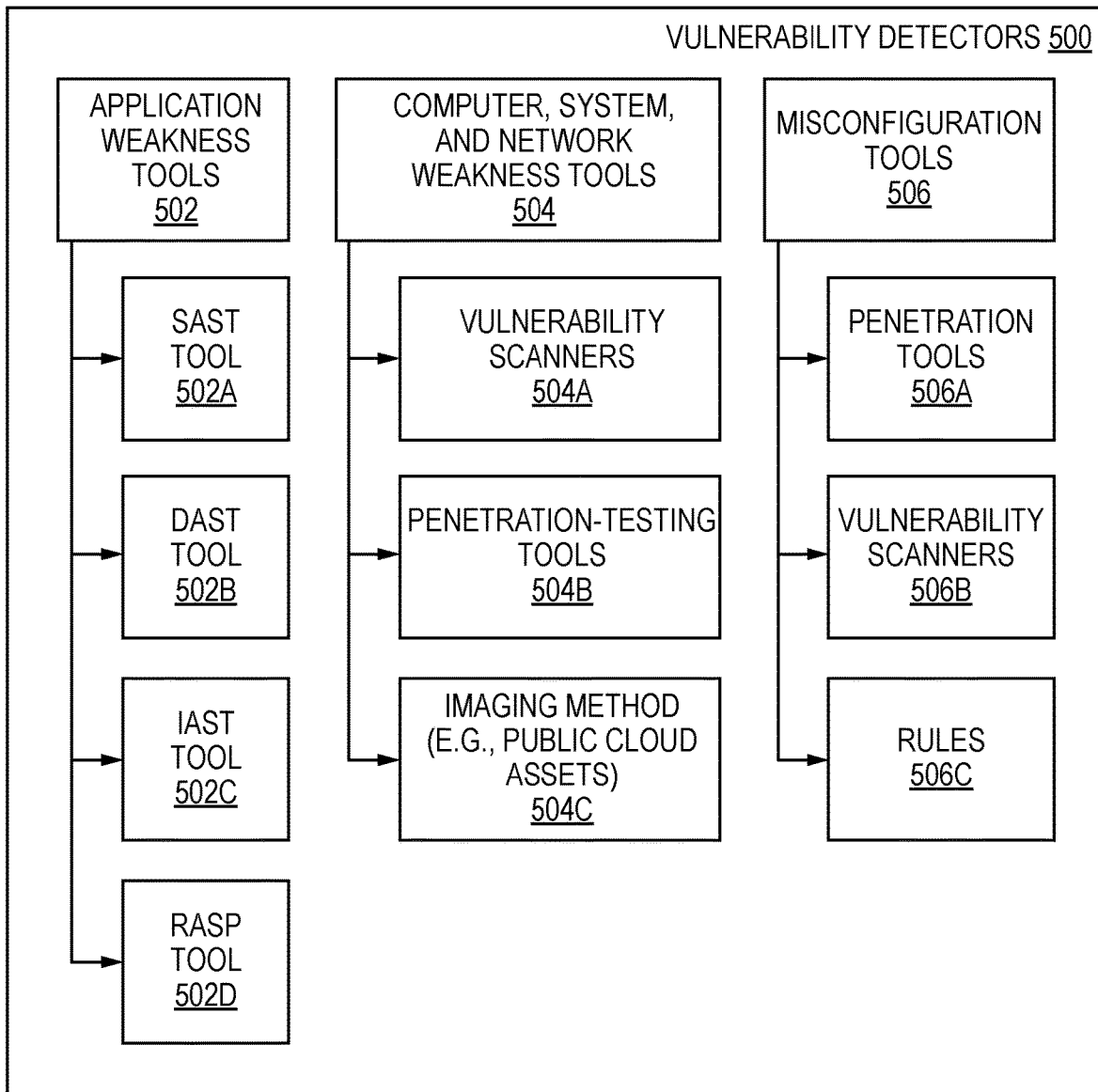
FIG. 5 is a block diagram illustrating vulnerability detectors according to some embodiments.

In certain embodiments, given the various components of the business application, there can be vulnerabilities (e.g., buffer overflows), along with weaknesses (e.g., unencrypted passwords) and/or misconfigurations (e.g., using a default administrator password) in the various assets, applications, and services. Identifying security issues is crucial to identify, predict, and prevent an attack from taking place. In certain embodiments, this "security issues" information is derived from various sources such as the vulnerability detectors 500 (e.g., static scanners, dynamic scanners, pen testing tools, etc.) as shown in FIG. 5. In certain embodiments, the security platform is to take the security information (e.g., vulnerabilities, weaknesses) and correlate it to the network architecture to analyze the potential ways the issues could be manifested. Example operations to identify and predict security issues and propose remediations are outlined in FIG. 6.

Collecting Security Data: Several tools such as scanners, vulnerability management, software composition analysis and penetration test tools, are used to scan a particular network or use agents to provide information about the services running on servers, the software packages associated with the services and the vulnerabilities associated with the service in certain embodiments. For example, server code (e.g., a certain version number) is running on port 80 and 443 and is subject to three vulnerabilities. In certain embodiments, such information is collected and further analyzed and associated with asset information to understand the criticality and impact of the vulnerabilities on the assets in an enterprise. In certain embodiments, these tools can also use various analysis techniques to report about misconfigurations such as missing authentication checks, weak passwords, anonymous logins allowed, etc. In certain embodiments, external vulnerability sources such as National Vulnerability Database, security forums, and vendor advisories could be used to enhance the security information.

In certain embodiments, tools such as secure code analysis tools (SAST), dynamic code analysis tools (DAST), and interactive application security testing (IAST) tools either scan the code or use agents deployed on endpoints running the code to report any weakness information. Such tools can be used to retrieve weakness information associated with applications.

FIG. 5 is a block diagram illustrating vulnerability detectors 500 according to some embodiments. Depicted vulnerability detectors 500 includes application weakness tools 502, computer, system, and network weakness tools 504, and misconfiguration tools 506 to detect those corresponding issues. In certain embodiments, application weakness tools 502 includes one or more of: secure code analysis tool (SAST) 502A, dynamic code analysis tool (DAST) 502B, interactive application security testing (IAST) tool 502C, or run-time application security protection (RASP) tool 502D. In certain embodiments, computer, system, and network weakness tools 504 includes one or more of: vulnerability scanner(s) 504A, penetration testing tool 504B, or imaging method 504C (e.g., on public cloud assets). In certain embodiments, misconfiguration tools 506 includes one or more of: penetration testing tools 506A, vulnerability scanners 506B, or rules 506C.

Figure 6:
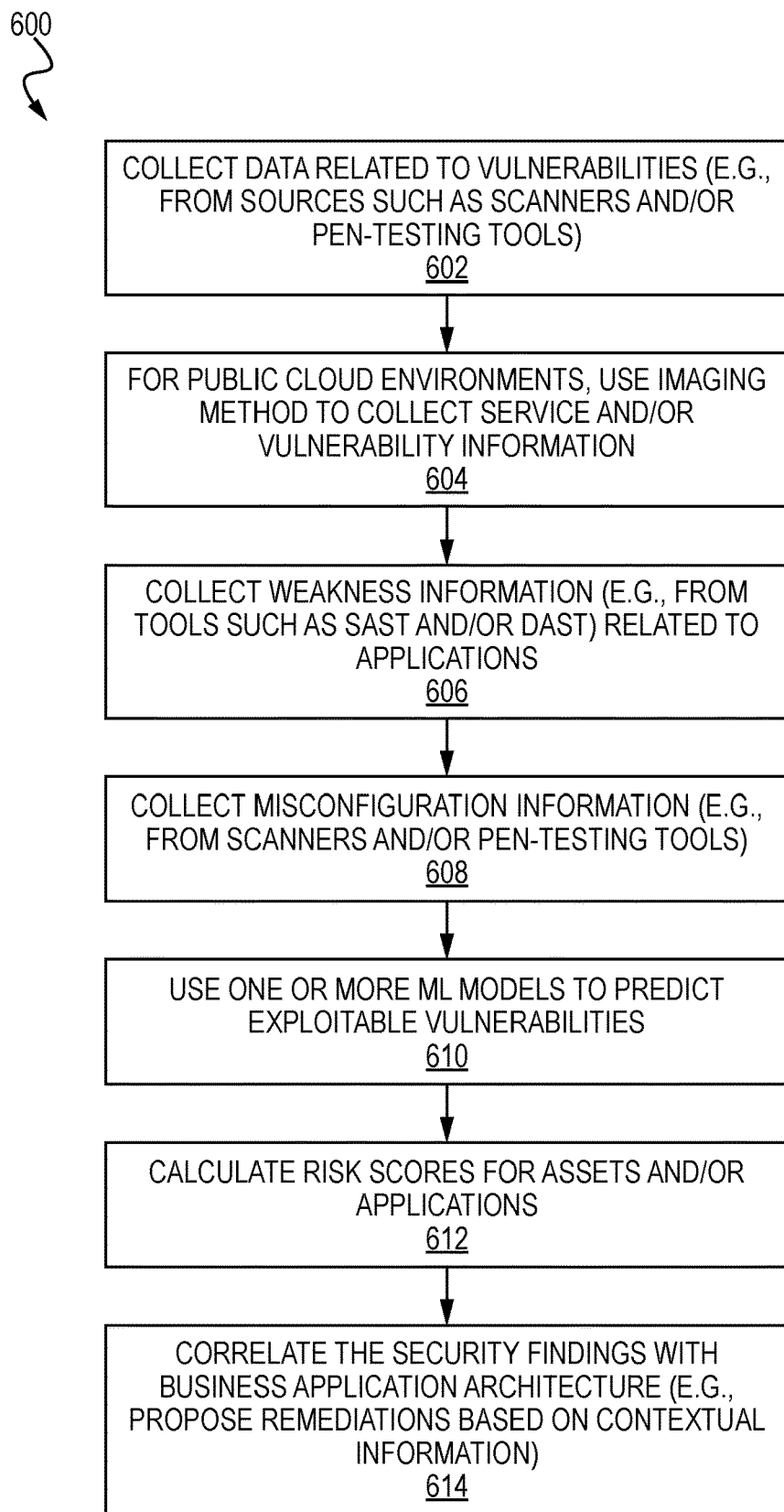
FIG. 6 is a flow diagram illustrating operations of a method for identifying and predicting security issues and proposing remediations according to some embodiments.

FIG. 6 is a flow diagram illustrating operations 600 of a method for identifying and predicting security issues and proposing remediations according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by a security platform (or a component thereof) of the other figures.

The operations 600 include, at block 602, collecting data related to vulnerabilities from the sources (e.g., from vulnerability detectors 500) (e.g., vulnerabilities 110 in FIG. 1) such as, but not limited to scanners and/or pen-testing tools. The operations 600 further include, at block 604, for public cloud environments, using a machine imaging method to collect service and vulnerability information (e.g., as discussed below). The operations 600 further include, at block 606, collecting weakness information (e.g., from tools such as SAST and/or DAST) related to applications. The operations 600 further include, at block 608, collecting misconfiguration information (e.g., from scanners and/or pen-testing tools). The operations 600 further include, at block 610, using one or more machine learning models to predict exploitable vulnerabilities (e.g., and weaknesses and/or software misconfigurations). The operations 600 further include, at block 612, calculating risk scores for assets and/or applications. The operations 600 further include, at block 614, correlating the security findings with business application architecture, e.g., and proposing remediations based on contextual information.

Exploit Prediction and Risk Scoring: Currently there are thousands of vulnerabilities as reported by the National Vulnerability Database and hundreds of weaknesses as per Common Weakness Enumeration, and likely many more which are undocumented. In certain enterprises, there are applications (e.g., which use various technologies) running software with varied versions, and each of those may (or do) have numerous vulnerabilities. Embodiments herein calculate an "Exploitability Prediction Rating" (EPR), which provides a rating related to the exploitability of a vulnerability (e.g., and a weakness and/or a misconfiguration) and/or the exploitability of a particular technology/software. In certain embodiments, a machine learning model is trained and used to interpolate the prediction rating, for example, a machine learning (ML) model including, but not limited, to classification, clustering, and forecast models. An algorithm such as Gradient Boosted Model, Random Forest, K-Means, or Bayesian Model is used for the learning in certain embodiments.

In certain embodiments, the process of training an ML model involves providing training data to an ML algorithm, e.g., with the training data including data and features related to the prediction to be achieved. In certain embodiments, the output of the ML model then captures the patterns needed to predict and provide answers.

In certain embodiments herein (e.g., for an attack inference engine 112), a machine learning model is to predict (i) the exploitability of a vulnerability (e.g., and/or a weakness and/or a misconfiguration), and/or (ii) the exploitability of software (e.g., and its version), for example, even when the software has no current vulnerabilities associated with it. In certain embodiments, the training data includes one or any combination of the following features related to vulnerabilities (e.g., and weaknesses and/or misconfigurations) and software: identifier for the vulnerability/weakness, identifier for the software along with its version, number of references to the vulnerability, number of software and versions affected by vulnerability, number of exploits available for vulnerability, number of advisories published for vulnerability, time between exploit availability and disclosure of vulnerability, availability of a fix for a vulnerability, type of fixes available (e.g., patch and/or workaround), time between disclosure/exploit availability and fix provided, time since fix was available, popularity of the software affected (e.g., based on percentage of exploits existing or number of instances of software in a particular environment), percentage of vulnerabilities associated with the software, standard severity rating of the vulnerability, references indicating if vulnerability is widely exploited, type of service/application affected (e.g., web application, database application, security application, etc.), general impact in case of exploitation, ease of exploitation, and/or number of vulnerability identifiers associated with a weakness.

In certain embodiments, a machine learning model (e.g., trained using the above) is then utilized on an enterprise (e.g., a profile identifying that enterprise and/or their assets, services, and/or infrastructure) and the output of the model is one or more predictions about exploitability of a vulnerability and/or exploitability of the assets, services, and/or infrastructure (e.g., assets, services, and infrastructure 102 in FIG. 1) of the user, e.g., even when there is no current vulnerability. In certain embodiments, the exploitability of the assets, services, and/or infrastructure is a prediction that indicates if those assets, services, and/or infrastructure (e.g., software) are exploitable even if there is not current vulnerability associated with them (e.g., it), e.g., predicting development of 0-day exploits.

In certain embodiments, a machine learning model determines the exploitability of a vulnerability of the assets, services, and/or infrastructure (e.g., software) regardless of their (e.g., its) placement in an enterprise.

In certain embodiments, a security platform has collected data related to assets and/or business applications, and thus the EPR rating(s) are correlated with the contextual information to predict the assets and/or business applications that are most exploitable. In certain embodiments, the asset and/or business application risk scores are determined using factors related to the resources themselves in addition to the vulnerability and/or software EPR.

In certain embodiments, the factors used for calculating asset and/or business application risk scores includes one or any combination of the following: type of exposure of asset and/or business application (e.g., public or private), type of service(s) associated with the asset and/or business application (e.g., web, database, networking, security, name resolution, etc.), criticality of asset and/or business application (e.g., is it used in production/development), type of asset (e.g., computer, virtual machine, router, security device, etc.), existence of security controls (e.g., WAF, IPS, firewall, vulnerability management, etc.), the number of other business applications connected to it (e.g., discovered using business apps network architecture), and/or the number of connections to other datacenter(s) of the enterprise.

In certain embodiments, assets and business applications have several vulnerabilities associated with them, for example, and the corresponding risk score is a function of the EPR scores of all vulnerabilities, EPR scores of software running on the asset or used in the business application, severity scores of misconfigurations, and/or the above defined factors. In certain embodiments, the scores thus calculated are used to prioritize the assets and/or business applications that are (e.g., prioritized) to be remediated of security issues.

Identifying Attack Patterns: in certain embodiments, the prediction(s) about exploitability of a vulnerability and/or exploitability of the assets, services, and/or infrastructure (e.g., assets, services, and infrastructure 102 in FIG. 1) is used to identify one or more attack patterns and/or attack paths for an attacker (e.g., "hacker") in those assets, services, and/or infrastructure.

Certain embodiments herein use the network connectivity (e.g., network architecture 400 in FIG. 4) of a business application within (e.g., and to other business apps), to identify (e.g., predict) attack patterns. In certain embodiments, the predicted attack patterns are used to (e.g., visually) depict the potential paths and/or lateral spread in case of a potential exploitation. In certain embodiments, this helps an enterprise secure its assets, services, and/or infrastructure (e.g., its assets and applications) in the propagation path.

As one example, a business application (e.g., software application stack) includes a web tier, an app tier, and a database tier, e.g., where each tier involves several assets and corresponding applications (e.g., as discussed in reference to business application discovery herein). In certain embodiments, the highest risk vulnerabilities and software in the business application are identified, e.g., by attack inference engine.

In certain embodiments, the network activity in the environment is correlated with the security issues in the various components, e.g., to provide insight into any ongoing cyberattacks.

In certain embodiments, a score (e.g., EPR score) for a potential risk of exploitation for each of the components (e.g., assets and business applications) is determined (e.g., calculated). In certain embodiments, a risk score serves as an indicator of the exploitability of a particular business application (or the whole computing environment), e.g., such that this knowledge would help a security officer and/or security platform to prioritize the mitigating or fixing of the issue(s).

Figure 7:
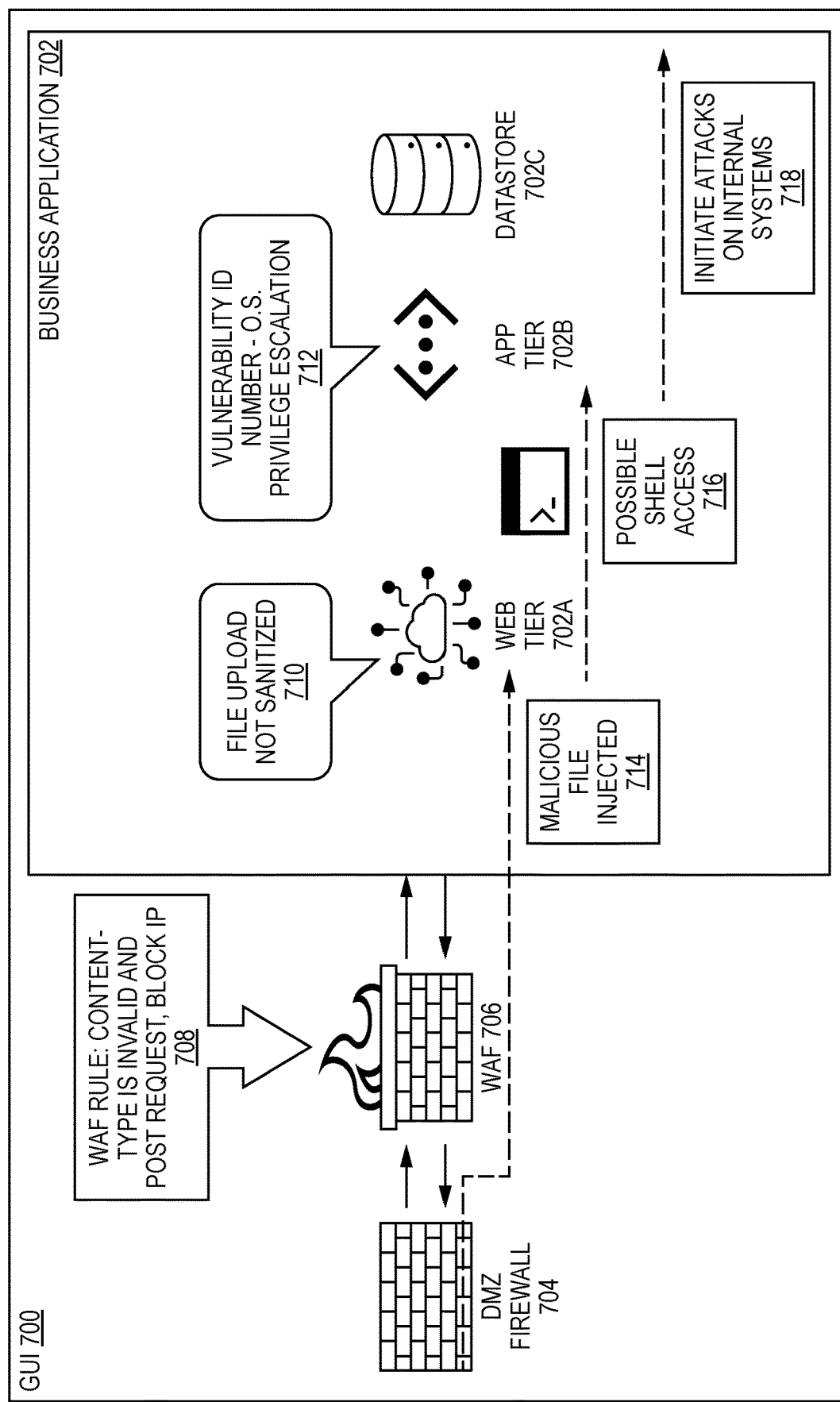
FIG. 7 is a diagram illustrating a graphical user interface for indicating one or more attack paths with a corresponding indication of a corresponding remediation for each attack path and a corresponding vulnerability for each attack path according to some embodiments.

In certain embodiments, a human (e.g., security officer) has difficulty correlating the vulnerabilities with the assets, services, and/or infrastructure, e.g., as this is not practicably performed with the mind or pen and paper. Certain embodiments herein thus provide a graphical user interface (GUI) for indicating one or more attack paths and/or a corresponding indication of a corresponding remediation for each attack path and a corresponding vulnerability for each attack path. In certain embodiments, based on the weaknesses, potential mitigations are determined, e.g., and if mitigations already exist, the inference about potential attack paths and risk scores is adjusted and depicted accordingly (e.g., in the GUI). FIG. 7 depicts examples of potential attack paths.

FIG. 7 is a diagram illustrating a graphical user interface (GUI) 700 for indicating one or more attack vectors (710 and 712) with a corresponding indication (714, 716, and 718) of the impact of the potential attack, and a corresponding remediation for the attack path (e.g., 708). The vulnerability prioritization and the impact of those vulnerabilities are utilized to prioritize the most critical and high impact attack paths according to some embodiments. Although shown on a single GUI 700, in other embodiments, a first GUI can be used to indicate an attack path (e.g., and the underlying vulnerability or vulnerabilities) and a separate second GUI to indicate remediation(s) and the impact of applying the remediations.

In certain embodiments, a security platform (e.g., security platform 100) generates an inference of one or more attack paths. The inferences might indicate a potential high risk attack, a high risk impact on confidentiality, a high risk of potential data extraction, a high risk of lateral spread of an attack, remediation that could hinder the attack. For example, in FIG. 7, the network architecture of a (e.g., "DMZ") firewall 704 and a web application firewall (WAF) 706 connect business application 702 (e.g., to the public internet). In the depicted embodiment, the security platform (e.g., security platform 100) has determined that business application 702 includes a web tier 702A, coupled to an application tier 702B, that is coupled to a datastore (e.g., database) 702C, and has inferred (e.g., via attack inference engine 112) that a possible attack path exists at 714 for the injection of a malicious file (e.g., past firewall 704 and firewall 706), that a possible attack path exists at 716 for a possible shell access 716, and a possible attack path exists at 718 for initiating attack(s) on internal systems 718 (e.g., on datastore 702C and potential data extraction from the datastore). In the depicted embodiment, the security platform (e.g., security platform 100) has inferred (e.g., via attack inference engine 112) that a possible remediation for the attack path at 714 is to generate a WAF rule at 708 (e.g., "content type is invalid and post request, block IP" of sender), a possible remediation for the attack path at 716 is to sanitize the file upload at 710, and a possible remediation for the attack path at 718 is to fix the vulnerability (e.g., also listing the vulnerability identification (ID) number) and block an OS privilege escalation.

In certain embodiments, one or any combination of these remediations are displayed in the GUI 700, e.g., indicating the remediation status (e.g., complete) and/or requesting permission to perform the remediation (e.g., from a user).

Real-time Security Event Input: In certain embodiments, real-time security event (e.g., a detected anomaly) input is utilized (e.g., with the prediction(s) about exploitability of a vulnerability and/or exploitability of the assets, services, and/or infrastructure (e.g., assets, services, and infrastructure 102 in FIG. 1)) to identify one or more attack patterns and/or attack paths for an attacker (e.g., "hacker") in those assets, services, and/or infrastructure. In certain embodiments, the security platform (e.g., security platform 100) determines one or more anomalies within network traffic of the network architecture.

In certain embodiments (e.g., in addition to the vulnerability, weakness, and misconfiguration security findings), the real-time traffic is a source of various events such as security alerts, anomalies, and events. In certain embodiments, security alerts include alerts reported by various security tools (e.g., an Intrusion Prevention System). In certain embodiments, events are reported by tools (e.g., SIEM tools), based on application logs, firewall logs, etc. In certain public cloud environments, events are obtained using various methods such as cloud monitoring logs. In certain embodiments, the logs include events such as changes in VM state, change in ACLs, firewall rules, etc. In certain embodiments, anomalies include scanning activity (e.g., port scan, IP scan, network scan, timing-based activities such as unusual account activity, unexpected activity on an IP, spike in network activity, etc.). Certain embodiments herein detect anomalous activities using machine learning model (e.g., separate or as part of an ensemble of an attack inference engine). In certain embodiments, combining the discovered asset, application, and security findings with real-time events allows for the prioritization of the events and/or detection of any ongoing malicious activity.

Anomaly Detection: in certain embodiments, the security platform (e.g., security platform 100) detects anomalies within the network traffic of an enterprise. Certain embodiments take into account the diversity of the enterprise deployment (e.g., whether the assets are in different public clouds). In certain embodiments, a machine learning model is trained and used to detect anomalies, e.g., a classification, clustering, and/or time-based model. An algorithm such as Random Forest, K-Means, or Bayesian Model is used for the learning in certain embodiments.

In certain embodiments, network data contains information about the various network connections. To create an anomaly detection ML model, certain embodiments use several of these fields and use certain calculated fields, e.g., which overall define the features of the data set. In certain embodiments, the process of training the anomaly detection ML model involves providing training data to an ML algorithm, e.g., with the training data including one or any combination of: source IP (e.g., for traffic entering from internet 410 in FIG. 4), destination IP, source port, destination port, number of packets, number of bytes, bytes per packet within a time period, bytes per packet per destination port, bytes per packet per destination IP, frequency of source IP, frequency of destination IP, frequency of destination port, source IP (e.g., external, internal, local area network (LAN), etc.), number of subnets in a network, number of IPs in a subnet, number of distinct IPs seen in a time period (e.g., per day, per week, per month, etc.), source of the network data (e.g., cloud, on-premises, etc.), percentage of traffic based on network data, and geographic distribution of source IPs.

In certain embodiments these features are used to generate a traffic model for each enterprise deployment. In certain embodiments, the model is trained using the above features to obtain the required traffic model. In certain embodiments, this model is used to detect anomalies, e.g., one or any combination of host port scans (e.g., scan all ports on a host from same source), network port scans (e.g., scan several ports on several hosts from same source), network scans (e.g., detect active hosts in a network), too high or too low activity for a destination IP, too high or too low activity for a destination port, unexpected activity at a particular time for an IP, and/or unexpected high network activity within a network.

In certain embodiments, the anomaly output is combined with other security findings (e.g., vulnerabilities) to detect cyber activity happening in a particular environment.

Example Architecture

Figure 8:
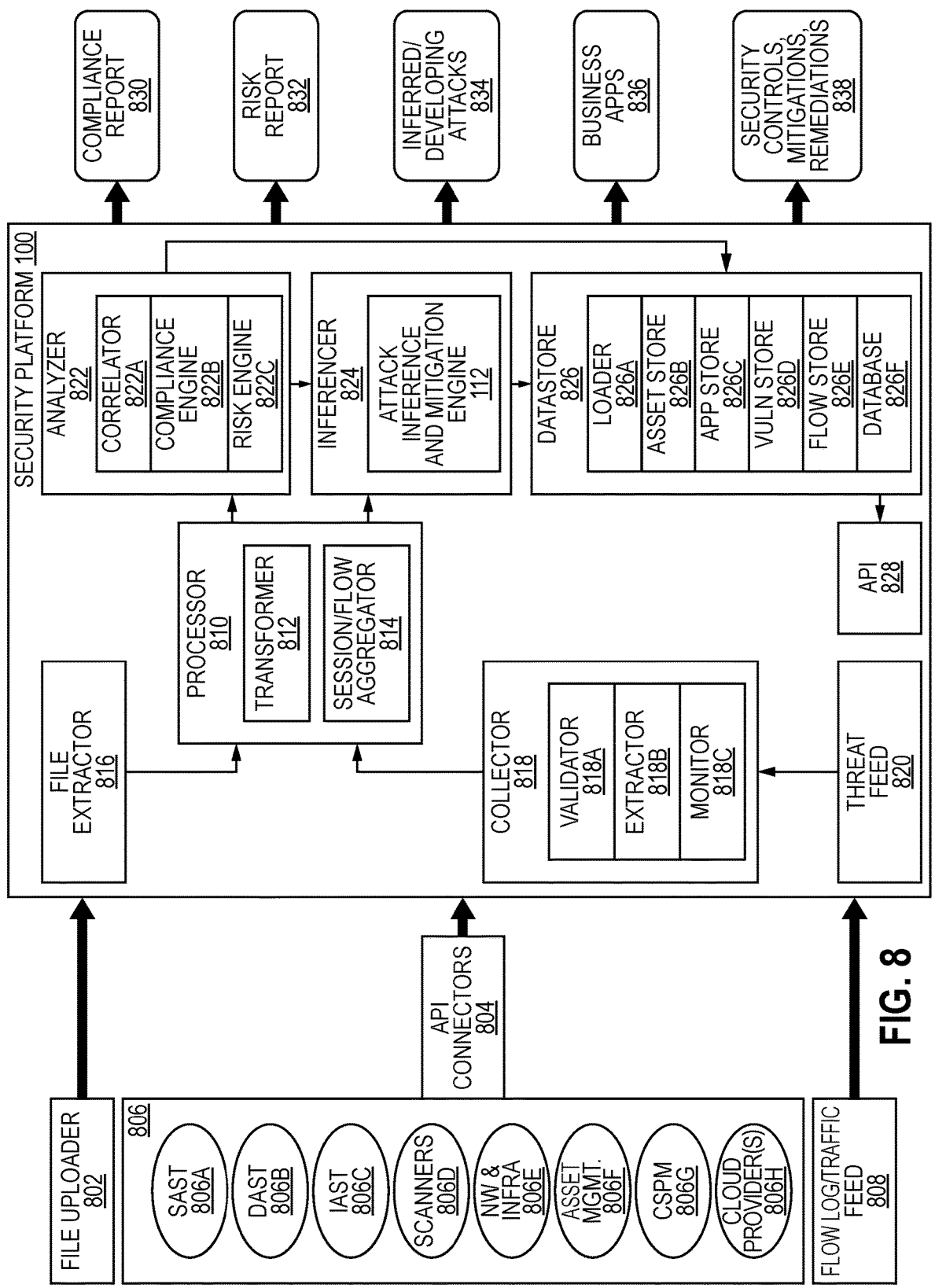
FIG. 8 is a block diagram of an example architecture of a security platform according to some embodiments.

FIG. 8 is a block diagram of an example architecture of a security platform 100 according to some embodiments.

In certain embodiments, security platform 100 is to extract information (e.g., anomaly information) via one or more API connectors 804 (e.g., of tools/products 806). In certain embodiments, tools 806 include one or any combination of SAST 806A, DAST 806B, IAST 806C, scanners 806D, network and infrastructure 806E tools, asset management tools 806F, CSPM 806G, and/or cloud provider(s) 806H.

In certain embodiments, the cloud provider(s) 806H are third-party provider(s) that provide computing, storage, networking, and/or infrastructure resources on-demand (e.g., accessible through the internet).

In certain embodiments, the tools/products 806 provide access to information through their Application Programming Interface (API) served over HTTP/HTTPS. In certain embodiments, the security platform 100 connects to these tools/products 806 and extracts information by connecting to the APIs 804 provided by the tools/products.

In certain embodiments, file uploader 802 provide access to information, e.g., extracted by file extractor 816. For certain (e.g., legacy) products, API access might not be available, in which case, the data can be extracted through appropriate file uploads by file uploader 802. In certain embodiments, predefined file types and/or information are supported.

In certain embodiments, flow log/traffic feed 808 provides access to information. In certain embodiments, the traffic logs or in certain cases flow logs (e.g., public clouds) are periodically gathered to analyze the traffic patterns.

In certain embodiments, the collector 818 (e.g., service) has three functionalities. For example, (1) in certain embodiments, the collector's validator 818A (e.g., service) validates the API connector related information (e.g., API keys, authentication tokens, URLs, etc.) or in the case of file uploads, the relevant fields included. In certain embodiments, (2) the collector 818 (e.g., service) extracts the relevant information from the various feeds, for example, including the threat feed 820, which may include vulnerability information such as from a vulnerability database (e.g., national vulnerability database (NVD), bug bounty, external intelligence feeds, etc.). In certain embodiments, (3) where the data related to assets, apps, services, network, infrastructure, and vulnerabilities is dynamic in nature, the monitor 818C (e.g., service) monitors for any changes (e.g., at regular intervals) and extracts the data accordingly.

In certain embodiments, the processor 810 (e.g., service) includes a transformer 812 (e.g., service) that performs transformation of the extracted data, for example, where the data retrieved from various sources is not uniform. In certain embodiments, the processed data includes information about assets, apps, services, network and vulnerabilities, and the required fields related to these. In certain embodiments, the session (e.g., flow) aggregator 814 (e.g., service) aggregates the flow/traffic logs into flows or sessions, so further analysis can be applied, e.g., and patterns observed accordingly.

In certain embodiments, the analyzer 822 (e.g., service) correlates the processed data such as those about assets, apps, services, network, and vulnerabilities. In certain embodiments, the traffic/flow patterns are correlated by the correlator 822A with the other extracted data to visualize the network architecture. In certain embodiments, the network architecture of a business application is thus presented accordingly, e.g., in a GUI. In certain embodiments, the compliance engine 822B (e.g., service) uses the vulnerability (e.g., and weakness) information to search for compliance issues and flag them. In certain embodiments, the risk engine 822C (e.g., service) calculates the cybersecurity risk scores for the various assets and business applications.

In certain embodiments, the inferencer 824 (e.g., service) includes attack inference (e.g., and mitigation) engine 112 (e.g., service). In certain embodiments, inferencer 824 (i) correlates the business application architecture with the vulnerability information and inference potential (e.g., likely) attack paths (e.g., the activity related to traffic/flows can further be overlayed on the attack paths, to show any developing or ongoing attacks) and/or (ii) proposes any mitigations or countermeasures in order to prevent any potential cybersecurity exploitation.

In certain embodiments, the datastore 826 (e.g., service) provides the interfaces used to store and/or retrieve the data in a database. In certain embodiments, the interface functionality is provided by the loader 826A. In certain embodiments, the various data is stored in logical data structures/partitions (e.g., tables), e.g., asset store 826B, application store 826B, vulnerability store 826D, and/or flow store 826E. In certain embodiments, the relations between these various partitions are stored as well. In certain embodiments, the data stored in the database 826F is exposed through an application programming interface (API) 828, e.g., served on a web channel.

In certain embodiments, the security platform thus generates one or any combination (e.g., generates multi-fold results and is arranged as per the consumer of the information). In certain embodiments, there are various views shown on the user interface and corresponding reports can be generated such as compliance report 830, risk report 832, inferred/developing attacks 834 (e.g., attack paths), business applications 836 (e.g., as shown in FIGS. 4 and 7), and proposed security controls, mitigations, and/or recommendations 838 (e.g., as shown in FIG. 7).

(II) Methods for Vulnerability Assessment for Cloud Assets Using Imaging Methods Certain enterprises are adapting an Infrastructure as a Service (IaaS) environment, e.g., where IaaS is a form of cloud computing that provides virtualized resources over the internet. Since the resources can be located anywhere on the internet (e.g., and these resources may be referred to as being in the "cloud"), and accessed from anywhere, it poses several security challenges. The shared security model of certain cloud providers may ensure that the underlying infrastructure to run the virtual resources are secure. However, in certain embodiments, the responsibility of ensuring the security of assets running on top of the virtual resources lies with the user (e.g., customer of the cloud service provider). In certain embodiments, the responsibilities related to this are the managing of operating system(s), application software, services (e.g., together referred as assets), and ensuring proper IT controls for the assets running on the virtual resources. Certain embodiments herein are directed to methods and systems to detect security issues related to the assets in public cloud environments.

In certain embodiments, a public cloud is an IT model where resources for computing, storage, networking, and/or infrastructure are provided on-demand by a (e.g., third-party) cloud service provider (e.g., and are accessible through the internet). In certain embodiments, a cloud service provider (CSP) is a third-party company offering computing, storage, networking, and/or infrastructure as a cloud-based platform. In certain embodiments, a virtualized environment is a layer of software, typically known as a hypervisor, that sits between the hardware and operating system, e.g., where the hypervisor can host multiple operating system(OS)/application servers, also known as virtual machines (VMs)/guests, on the same physical hardware. In certain embodiments, a virtual machine (VM) (e.g., virtual instance) is a compute resource, that runs in software, emulating a physical machine, e.g., it runs in a virtualized environment. In certain embodiments, a virtual hard drive (or virtual hard disk drive (HDD)) is a software component that emulates a physical storage device such as a hard disk, optical disc drive, or a floppy disk drive, e.g., and is associated with a VM. In certain embodiments, virtual machine (VM) memory is a software component that emulates a physical random access memory (RAM), e.g., and is associated with a VM.

Certain public cloud service providers (e.g., their platforms) provide a flexible, cost-effective way to create an enterprise IT environment including storage, servers, computing resources, and/or networking resources. Certain physical (e.g., non-cloud) data centers have been secured with solutions such as intrusion detection/prevention systems (e.g., firewall(s)), ensuring that data is secured within the boundary of the enterprise. Thus, in such a physical environment, enterprise security posture may be relatively easy to achieve using vulnerability scanners, network monitoring, and endpoint monitoring solutions. However, with certain cloud hosted data centers, there are no enterprise boundaries and obtaining a security posture poses new challenges. Certain security solutions, such as vulnerability scanning and network monitoring, may not suffice and instead add to the resource requirements and/or cause interruptions in order to achieve security. Embodiments herein are directed to systems (e.g., a mechanism) and methods to secure public cloud assets using imaging. In certain embodiments, this includes multiple options to create an image related to the assets in a public cloud environment. In certain embodiments, for such assets, a combination of the operating system, copy of the virtual hard disk(s), and a copy of the machine memory (e.g., RAM) defines the image of the assets. In certain embodiments, such an image is then parsed and analyzed to obtain security information, such as, but not limited to, an installed OS, installed application packages, running software, services running, applications associated with the services, containers running, and/or the associated vulnerabilities.

Certain embodiments herein perform operations including generating an image for an enterprise that indicates one or more software application stacks of a virtual instance of a cloud provider from an application programming interface of the cloud provider and a network architecture for the one or more software application stacks without installing and utilizing security monitoring software on the cloud provider, determining one or more vulnerabilities of the one or more software application stacks and one or more vulnerabilities of the network architecture from the image, providing the one or more vulnerabilities of the one or more software application stacks, and the one or more vulnerabilities of the network architecture as input to a machine learning model, generating an inference by the machine learning model that indicates one or more attack paths for an attacker in the one or more software application stacks and the network architecture, and transmitting the inference to a storage location or a security software application. The embodiments herein improve the ability to infer one or more attack paths in the software application stack(s) and network architecture for the software application stack(s) (e.g., of a business), with the improvement including using an image and a specifically trained machine learning model to perform the inference on an input of (i) the one or more vulnerabilities of the one or more software application stacks, and (ii) the one or more vulnerabilities of the network architecture (e.g., without installing and utilizing security monitoring software on the cloud provider).

Certain embodiments herein perform operations including generating an image for an enterprise that indicates one or more software application stacks of a virtual instance of a cloud provider from an application programming interface of the cloud provider and a network architecture for the one or more software application stacks without installing and utilizing security monitoring software on the cloud provider, determining one or more vulnerabilities of the one or more software application stacks and one or more vulnerabilities of the network architecture from the image, determining one or more anomalies within network traffic of the network architecture, providing the one or more vulnerabilities of the one or more software application stacks, the one or more vulnerabilities of the network architecture, and the one or more anomalies within network traffic of the network architecture as input to a machine learning model, generating an inference by the machine learning model that indicates one or more attack paths for an attacker in the one or more software application stacks and the network architecture, and transmitting the inference to a storage location or a security software application. These embodiments are an improvement to the functioning of a computer network, namely, network security. The embodiments herein improve the ability to infer one or more attack paths in the software application stack(s) and network architecture for the software application stack(s) (e.g., of a business), with the improvement including using an image and a specifically trained machine learning model to perform the inference on an input of (i) the one or more vulnerabilities of the one or more software application stacks, (ii) the one or more vulnerabilities of the network architecture, and (iii) the one or more anomalies within network traffic of the network architecture (e.g., without installing and utilizing security monitoring software on the cloud provider).

Certain embodiments herein are directed to methods for vulnerability assessment for cloud assets using imaging methods. Certain embodiments herein are directed to detecting vulnerabilities in network architecture and/or software application stacks using an imaging method, e.g., determining a machine image of the OS (e.g., kernel) and/or application layer (e.g., user and/or libraries) to determine vulnerability in a public cloud.

Certain embodiments herein are directed to an imaging method to analyze assets in a public cloud environment to obtain security related information such as services running, software packages installed, and the corresponding vulnerabilities associated therewith. In certain embodiments, such a method first uses the gathered information related to the virtual cloud assets. This could be achieved by interfacing with the public cloud APIs or using other tools that interface with the cloud APIs. In certain embodiments, a virtual machine (VM) in a public cloud environment is launched using a machine image, which contains information such as the operating system. In certain embodiments, the VM is associated with a virtual hard disk, e.g., where all the persistent information is stored. The virtual hard disk might have one or more virtual snapshots associated with it, e.g., where the snapshot is a copy of the virtual hard disk at a certain point in time. Certain public cloud providers have the provision to create a snapshot at any point in time. In certain embodiments, a VM in a public cloud environment is associated with virtual machine (VM) memory, where ephemeral data is stored, and this also includes the run-time environment of certain processes. Certain public cloud providers provide the ability to attach a virtual disk to copy any ephemeral data to the disk. In certain embodiments, the combination of OS information, virtual hard disk, and a copy of the VM memory provide an entire image of the running VM. Certain embodiments herein use the so created image for security analysis. Example operations to perform the analysis are outlined below, e.g., and may be expanded to include public cloud capabilities and/or the corresponding APIs provided thus forth.

In certain embodiments, the operations include one or any combination of: interfacing with the public cloud environment to obtain the list of VMs to be monitored by the security platform, querying the names and locations of the VMs and associated virtual disk and snapshot names and locations, creating an image of the monitored VMs for security analysis (e.g., with this action triggered at specified intervals or as per requirement), the image (e.g., including the OS information, virtual hard disk and copy of VM memory) can be copied over to a different location to help in speeding up the analysis process, the image is parsed and analyzed by the security platform to obtain security related information (e.g., the information can include, but is but not limited to, the installed OS, installed application packages, running software, services running, applications associated with the services, containers running on the VM, and the associated application vulnerabilities), the file system of the VM can further be analyzed to retrieve any sensitive information and/or misconfigurations such as clear text passwords, the retrieved security information can be further enhanced using data from external sources such as vulnerability databases, security feeds, threat intelligence tools, etc., and to help with further analysis.

Virtual Instances

Figure 9:
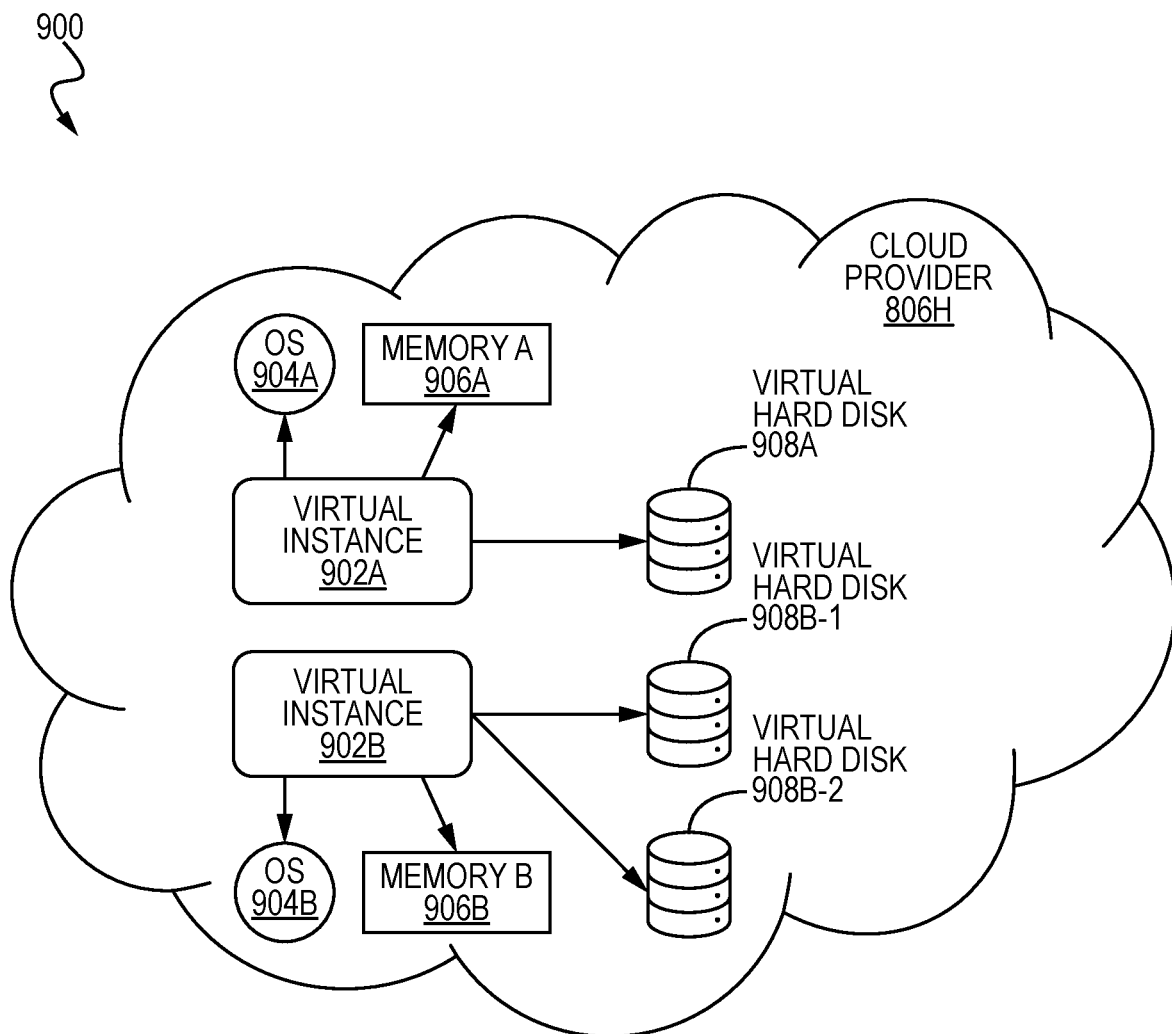
FIG. 9 is a block diagram illustrating virtual resources in a cloud environment according to some embodiments.

FIG. 9 is a block diagram 900 illustrating virtual resources in a cloud environment (e.g., cloud provider 806H) according to some embodiments. In certain embodiments, the virtual resources include one or more sets of virtual resources, its VM memory (e.g., virtual random access memory (RAM)), and its virtual hard disk (e.g., hard disk drive (HDD). For example, with a first virtual resource illustrated in FIG. 9 as cumulatively including a virtual instance 902A (e.g., computing resources), an operating system 904A (e.g., executing on the virtual instance 902A), a VM memory 906A (e.g., RAM), and a virtual hard disk 908A, and a second virtual resource illustrated in FIG. 9 as cumulatively including a virtual instance 902B (e.g., computing resources), an operating system 904B (e.g., executing on the virtual instance 902B), a VM memory 906B (e.g., RAM), and a plurality of virtual hard disks 908B-1 and 908B-2.

The following discusses examples that may be applied to the virtual resources for security analysis. There may be several virtual instances running in a (e.g., single) cloud environment (e.g., single cloud provider). In certain embodiments, a virtual instance has an operating system (OS) running on it, a virtual machine (VM) memory that is used to store and access data (e.g., on a short-term basis), and virtual hard disks used to store and access data (e.g., on a long-term basis). In certain embodiments, these components are virtualized, e.g., they are running as software components and emulating the physical equivalents of computers, RAM memories, hard disks, etc.

In certain embodiments, a (e.g., public) cloud provider provides an application programming interface (API) to retrieve information related to the virtual resources (e.g., virtual instances). In certain embodiments (e.g., at the same time), one or more APIs are used to create and update information for the virtual resources such as, but not limited to, adding virtual disk space, attaching virtual disks, changing memory (e.g., RAM) sizing, changing network settings (e.g., subnets and/or security groups), etc. In certain embodiments, the functionalities of the APIs are served through the web channels and are supported by a cloud service provider.

Certain embodiments herein use this API functionality to save and analyze the information related to the virtual resources (e.g., VMs). An example advantage of using this technique is multi-fold including not requiring changing the states of instances, not requiring installing any software (e.g., agents) on the instances (e.g., not installing and/or utilizing (e.g., third party) security monitoring software on the instances), and not adding to the network load/connections for the virtual resources (e.g., VMs).

Snapshots and Captures:

In certain virtualized environments, there is a provision to create point-in-time snapshots of the virtual hard disk, for example, used as fail-safe option to restore a virtual resource, e.g., a virtual instance (e.g., VM) and related resources, to a previously known safe state in case of a failure. Embodiments herein further utilize a snapshot for security analysis. In certain embodiments, the APIs (e.g., through API connectors 804 in FIG. 8) provided by a cloud service provider support functionalities related to snapshots, e.g., taking, deleting, and/or sharing a snapshot of a virtual hard disk.

Additionally, analyzing a VM's memory (e.g., RAM) is also essential for a comprehensive security analysis in certain examples. For example, the VM memory may hold certain in-flight operations that reveal important security information. Also, in certain cases malware could be memory resident without having a disk footprint, e.g., to hide themselves from disk analysis tools. Embodiments herein further utilize a memory (e.g., RAM) capture for security analysis.

Certain embodiments solely use the APIs provided by a cloud service provider to obtain both disk snapshots and memory captures, and then uses those for security analysis.

Imaging Technique:

In certain embodiments, the process of creating an image (e.g., in a disk image file format for storing the contents that are on a virtual hard disk, e.g., such that the virtual disk can be used in the same logical way as a physical hard disk) involves replicating the virtual instance without installing external (e.g., third party) software (e.g., agents) and without modifying the instance state. In certain embodiments, the components that define an instance are the operating system of the instance, the virtual hard disk (e.g., including snapshots), and the VM memory (e.g., virtual RAM). In certain embodiments, from a security perspective, analysis of these components provides a comprehensive view of the overall security posture of the virtual resource (e.g., virtual instance). An example of obtaining an image of an instance is discussed below in reference to FIG. 10.

Figure 10:
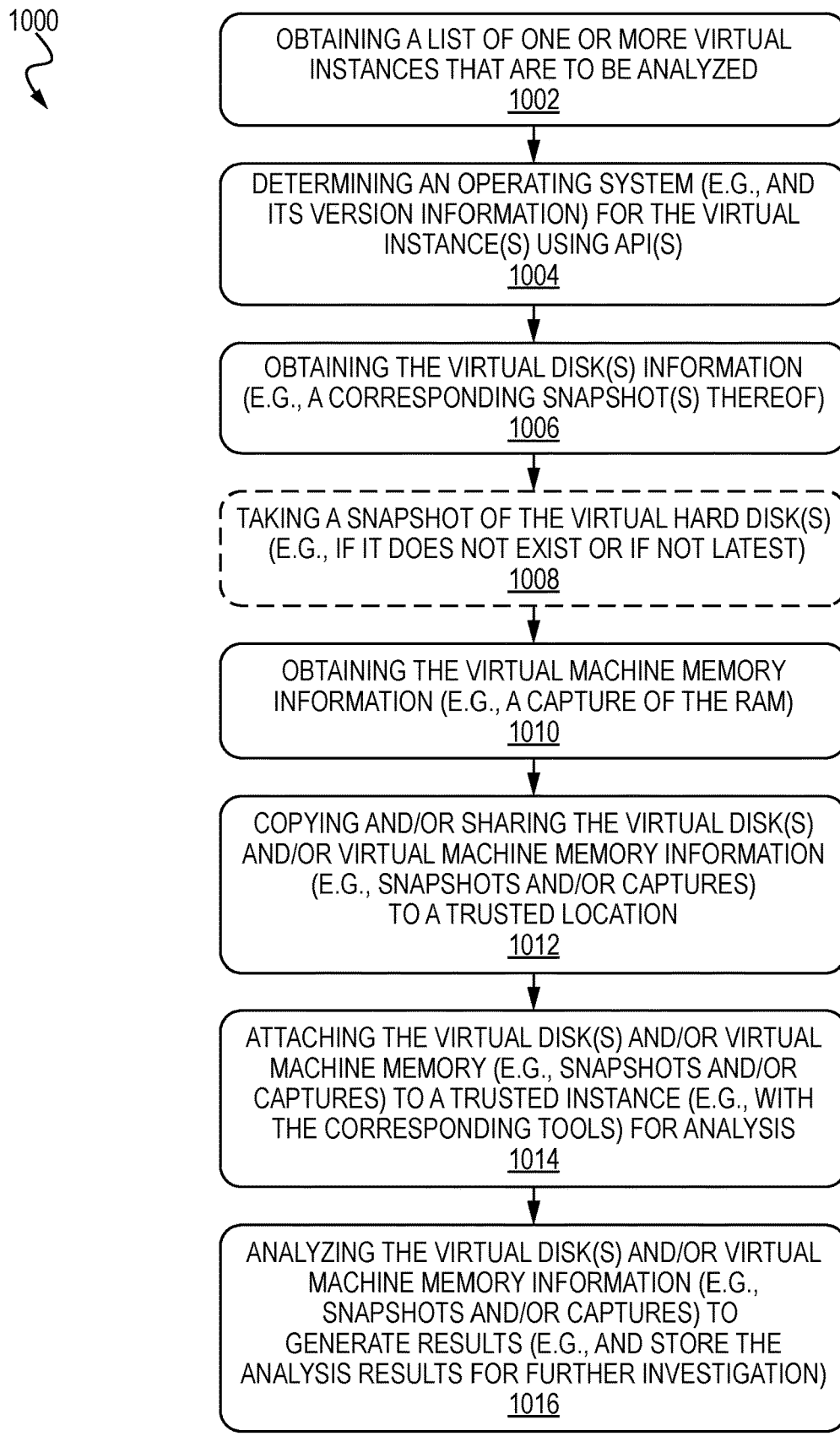
FIG. 10 is a flow diagram illustrating operations of a method for obtaining an image according to some embodiments.

FIG. 10 is a flow diagram illustrating operations 1000 of a method for obtaining an image according to some embodiments. Some or all of the operations 1000 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1000 are performed by a security platform (or a component thereof) of the other figures. In some embodiments, one or more (or all) of the operations 1000 are performed by a virtual instance or virtual function of a cloud provider.

The operations 1000 include, at block 1002, obtaining a list of one or more virtual instances that are to be analyzed. The operations 1000 further include, at block 1004, determining an operating system (e.g., and its version information) for the virtual instance(s), e.g., using API(s) of the cloud provider of that virtual instance. The operations 1000 further include, at block 1006, obtaining the virtual disk(s) information (e.g., a corresponding snapshot(s) thereof) of that virtual instance. The operations 1000 optionally include, at block 1008, taking a snapshot of the virtual hard disk(s) of that virtual instance (e.g., if it does not exist or if not latest (e.g., most current)). The operations 1000 further include, at block 1010, obtaining the virtual machine memory information (e.g., a capture of the RAM). The operations 1000 further include, at block 1012, copying and/or sharing the virtual disk(s) and/or virtual machine memory information (e.g., snapshots and/or captures) to a trusted location (e.g., separate from the virtual instance). The operations 1000 further include, at block 1014, attaching the virtual disk(s) and/or virtual machine memory information (e.g., snapshots and/or captures) to a trusted (e.g., virtual machine) instance (e.g., with the corresponding tools) for analysis. The operations 1000 further include, at block 1016, analyzing the virtual disk(s) and/or virtual machine memory information (e.g., snapshots and/or captures) to generate results (e.g., and store the analysis results for further investigation).

In certain embodiments, obtaining a list of one or more virtual instances (e.g., at block 1002) can be accomplished by one or more methods. As one example (1), once access is obtained to a CSP environment (e.g., such as an account, project, app, etc.) the CSP API(s) is used to retrieve the entire list of instances in certain embodiments. In certain embodiments, these instances are stored as a monitored list of instances. In certain embodiments, as part of continuous monitoring, the monitored list is amended based on whether each instance is active or suspended, new instances are being added, and/or instances are being deleted and/or terminated. As another example (2), a set of instances specifically could be tagged to be inserted into the list of monitored instances in certain embodiments. In certain of these embodiments, only those monitored instances could be analyzed. As yet another example (3), certain triggers are used to initiate an analysis scan for certain embodiments. Example triggers (e.g., events) can include a timed event (e.g., about every 24 hours), a change in state of the monitored instance(s), and/or new instances being added. In certain embodiments, the events are related to other security events, e.g., such as an anomaly being detected.

In certain embodiments, determining an operating system (e.g., and its version information) for the virtual instance(s) (e.g., at block 1004) can be accomplished by one or more methods. As one example (1), certain CSP API(s) are to directly provide information about the OS (e.g., and version) of the instances. In certain embodiments, the API(s) provide the corresponding machine image data. In certain embodiments, further API(s) relating to the machine image are used to determine the OS (e.g., and version information). As another example (2), the OS information (e.g., OS and/or its version) is obtained after the virtual disk is obtained. Certain locations on the disk (e.g., such as a (e.g., "/etc/os-release") command and/or file (e.g., folder) indicate system32 for a 32-bit version of an OS or system64 for a 64-bit version of an OS) indicate the OS (e.g., and version). As yet another example (3), certain CSPs are to have monitoring agents installed on the instances, for example, where if such agents are identified, the CSP API(s) to connect with the agents are used to obtain the system information (e.g., including OS and version).

In certain embodiments, obtaining the virtual disk(s) information (e.g., a corresponding snapshot(s) thereof) of that virtual instance(s) (e.g., at block 1006) and/or taking a snapshot of the virtual hard disk(s) of that virtual instance (e.g., if it does not exist or if not latest (e.g., most current)) (e.g., at block 1008) can be accomplished by one or more methods. In certain embodiments, to obtain a snapshot of the virtual disks, the operations include one or more of: obtaining the identification (e.g., IDs) and/or location of the virtual disks of the instances (e.g., there can be multiple disks associated with one instance), (ii) obtaining the IDs, locations, and/or the creation dates of the disk snapshots of the virtual disks if present, e.g., and if not present (or not the latest or most current snapshot (e.g., as determined by a threshold amount of time relative to the current time this analysis is being performed), the CSP API(s) are used to initiate the process of taking the required snapshots, and/or (iv) the snapshots are copied to trusted locations and/or shared with trusted sources (e.g., a security platform (e.g., security platform 100 in the FIGS) as described herein) for further analysis.

Figure 11:
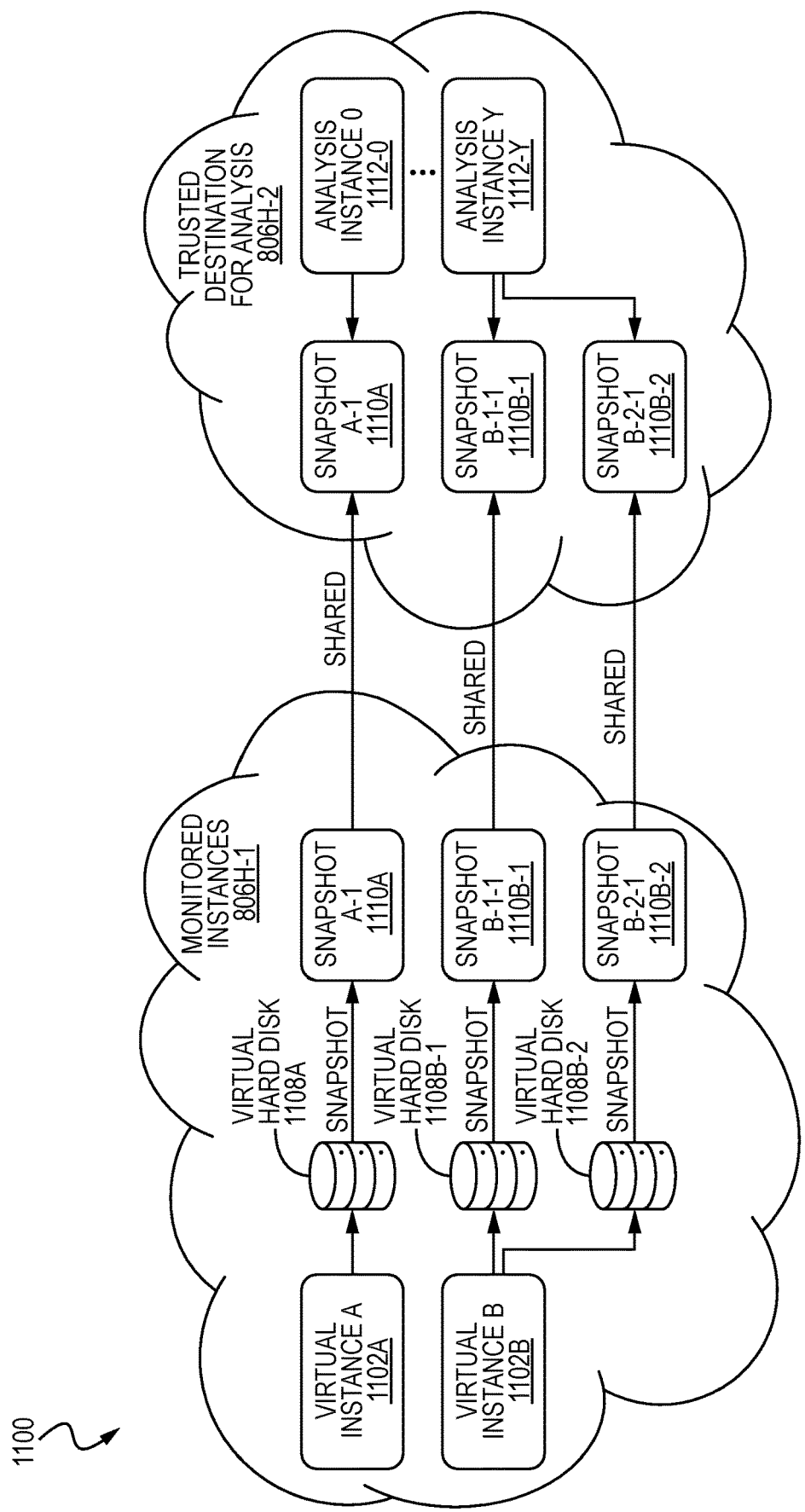
FIG. 11 is a block diagram illustrating multiple snapshots of virtual hard disks of multiple virtual instances in a cloud environment according to some embodiments.

FIG. 11 is a block diagram 1100 illustrating multiple snapshots of virtual hard disks 1108A and 1108B-1 to 1108B-2 of multiple virtual instances 1102A-1102B in a cloud environment according to some embodiments. In certain embodiments, a user (e.g., customer of a cloud service provider) has one or more virtual instances 1102A-1102B that are to be monitored to detect vulnerabilities (e.g., including weaknesses and/or misconfigurations) in an information technology (IT) environment, e.g., and use the security information (e.g., including vulnerabilities) to infer potential attacks. In certain embodiments, a cloud service provider 806H-1 includes one or more monitored instances. In certain embodiments, a trusted destination is included to perform a security analysis, for example, via one or more analysis instances 1112-0 to 1112-Y (where Y is any positive integer greater than one) that are in a same (e.g., 806H-1) or different cloud service provider 806H-2.

In certain embodiments, the operations to take a snapshot of virtual hard disk 1108A used by virtual instance 1102A is to generate snapshot 1110A in monitored instances in cloud provider 806H-1 and then share (e.g., copy) that into a version of snapshot 1110A stored in cloud service provider 806H-2, e.g., where that copy of the snapshot 1110A is then available for analysis by one or more analysis instances (e.g., analysis instance 1112-0). In certain embodiments, the operations to take a snapshot of virtual hard disks 1108B-1 to 1108B-2 (and although two virtual hard disks are shown, three or more hard disks may be present and snapshot(s) thereof taken according to the following) used by virtual instance 1102B is to (1) generate snapshot 1110B-1 in monitored instances in cloud provider 806H-1 for virtual hard disk 1108B-1 and then share (e.g., copy) that into a version of snapshot 1110B-1 stored in cloud service provider 806H-2, e.g., where that copy of the snapshot 1110B-1 is then available for analysis by one or more analysis instances (e.g., analysis instance 1112-Y), and (2) generate snapshot 1110B-2 in monitored instances in cloud provider 806H-1 for virtual hard disk 1108B-2 and then share (e.g., copy) that into a version of snapshot 1110 B-2 stored in cloud service provider 806H-2, e.g., where that copy of the snapshot 1110 B-2 is then available for analysis by one or more analysis instances (e.g., analysis instance 1112-Y).

In certain embodiments, obtaining the virtual machine memory information (e.g., taking a memory capture of the RAM) (e.g., at block 1010) can be accomplished by one or more methods. As one example (1), generating a capture of virtual (e.g., random access) memory of a virtual instance includes (i) obtaining the ID of the instance(s) to be analyzed, (ii), creating a machine image of the instance and share it with a trusted account, (iii) creating another (e.g., test) instance from the machine image and isolating the instance by removing all (e.g., internet) network access, (iv) logging into the instance and creating a dump of the memory, (v) uploading the memory capture to a trusted source, and/or (vi) terminating the test instance. As another example (2), generating a capture of virtual (e.g., random access) memory of a virtual instance includes (i) obtaining the ID of the instance(s) to be analyzed, (ii) creating another virtual disk (e.g., or a snapshot of a disk) that has a tool to capture memory, (iii) sharing/attaching this disk (e.g., or snapshot) with the instance(s) for which memory is to be captured (e.g., using the ID from (i)), (iv) mounting the attached virtual disk from within the instance(s) to be analyzed, (v) running the memory capture tool from the new disk against the instance(s) to be analyzed, and/or (vi) the memory capture can be directly analyzed using an additional tool(s) on the new disk (e.g., or the memory capture could be copied to a trusted source for further analysis). As yet another example (2), a method to analyze memory includes analyzing the VM memory stored as a page file in the virtual disk associated with instance(s), e.g., where page file(s) are an extension of the RAM memory as infrequently used memory (RAM) pages are backed up in the page file to allows the RAM to be used efficiently. In certain embodiments, the page file might not be the most up-to-date reflection of the RAM, however, it should be noted that analyzing this file would still provide useful security insights such as applications currently running.

Figure 12:
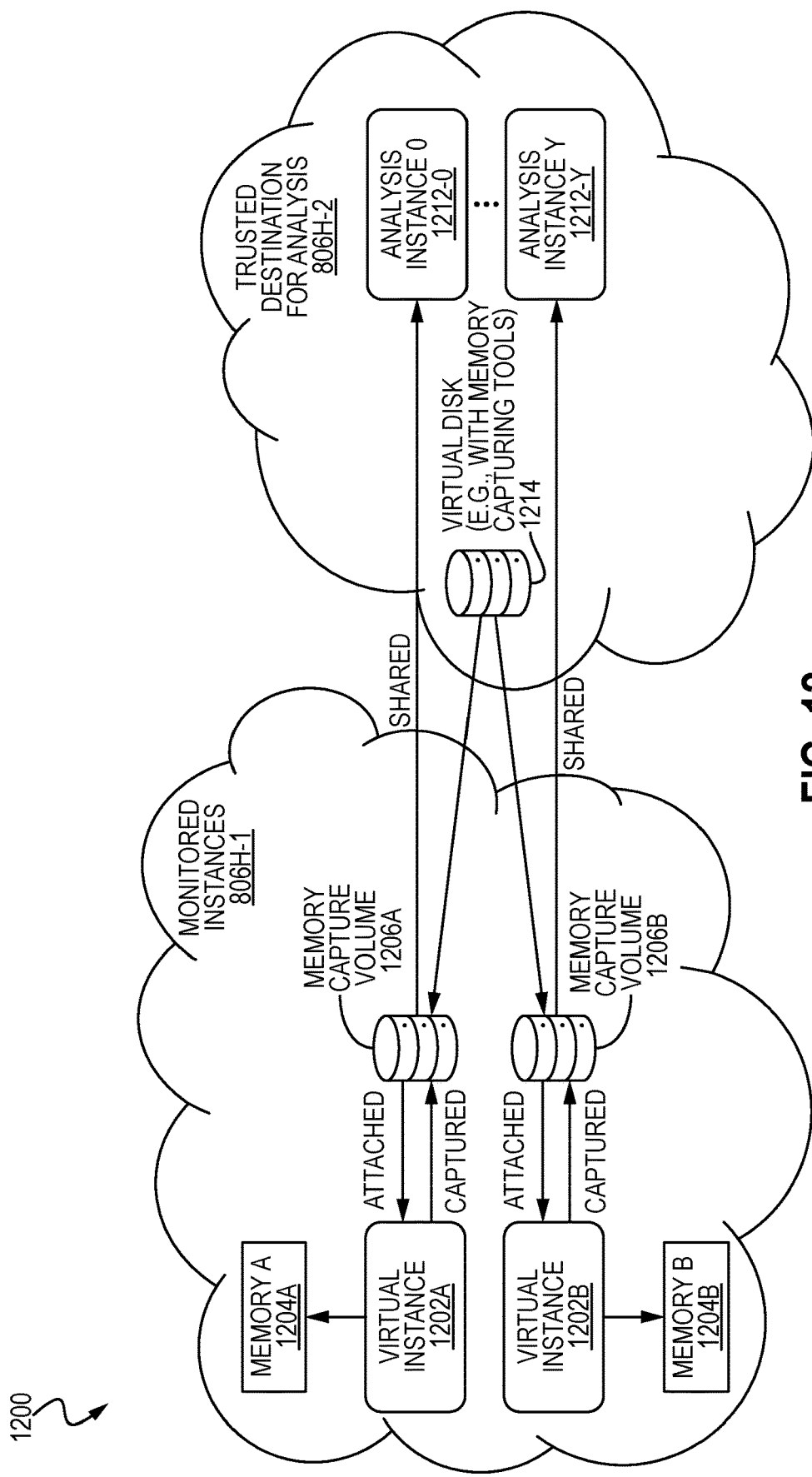
FIG. 12 is a block diagram illustrating a memory capture of multiple virtual (e.g., random access) memories of multiple virtual instances in a cloud environment according to some embodiments.

FIG. 12 is a block diagram 1200 illustrating a memory capture of multiple virtual (e.g., random access) memories 1204A-1204B of multiple virtual instances 1202A-1202B in a cloud environment according to some embodiments. In certain embodiments, a user (e.g., customer of a cloud service provider) has one or more virtual instances 1202A-1202B that are to be monitored to detect vulnerabilities (e.g., including weaknesses and/or misconfigurations) in an information technology (IT) environment, e.g., and use the security information (e.g., including vulnerabilities) to infer potential attacks. In certain embodiments, a cloud service provider 806H-1 includes one or more monitored instances. In certain embodiments, a trusted destination is included to perform a security analysis, for example, via one or more analysis instances 1212-0 to 1212-Y (where Y is any positive integer greater than one) that are in a same (e.g., 806H-1) or different cloud service provider 806H-2.

In certain embodiments, the operations to perform a memory capture of a virtual random access memory (RAM) 1204A used the virtual instance 1202A includes performing a memory capture of the RAM 1204A (e.g., in response a request sent by a memory capture tool of a virtual disk 1214 of cloud service provider 806H-2), storing the memory capture for RAM 1204A into attached memory capture volume 1206A (e.g., virtual hard disk) of cloud service provider 806H-1 (e.g., a same or different cloud service provider 806H-2 than cloud service provider 806H-2), and then sharing (e.g., copy) that memory capture of RAM 1204A for analysis by one or more analysis instances (e.g., analysis instance 1212-0). In certain embodiments, the operations to perform a memory capture of a virtual random access memory (RAM) 1204B used the virtual instance 1202B includes performing a memory capture of the RAM 1204B (e.g., in response a request sent by a memory capture tool of a virtual disk 1214 of cloud service provider 806H-2), storing the memory capture for RAM 1204B into attached memory capture volume 1206B (e.g., virtual hard disk) of cloud service provider 806H-1 (e.g., a same or different cloud service provider 806H-2 than cloud service provider 806H-2), and then sharing (e.g., copy) that memory capture of RAM 1204B for analysis by one or more analysis instances (e.g., analysis instance 1212-Y, where Y is any positive integer greater than one).

In certain embodiments, the virtual disk(s) and/or virtual machine memory information (e.g., snapshots and/or captures) are mounted to a trusted (e.g., virtual machine) instance (e.g., any of analysis instances 1112-0 to 1112-Y and/or analysis instances 1212-0 to 1212-Y) for analysis, for example, with the virtual disk(s) and virtual machine memory (e.g., RAM) mounted to a same (e.g., single) trusted (e.g., virtual machine) instance.

In certain embodiments, analyzing the artifacts (e.g., virtual disk(s) and/or virtual machine memory) collected for a virtual instance(s) (e.g., at block 1016) can be accomplished by one or more methods. In certain embodiments, analysis of the artifacts related to the instance(s) (e.g., virtual disk snapshot, memory capture, and/or OS information) provides extensive information about the instance(s), e.g., such as packages installed, running processes, identity keys used, indicators of malware, and more. The below further discusses use of a security platform and its architecture that performs the analysis and utilizes the analysis for presenting the overall security of the monitored environment.

Architecture

The following discusses an example architecture of a security platform to be used to image the monitored assets (e.g., instance(s)), store the analysis, and/or provide overall security views of the monitored environment.

Collector

Referring again to FIG. 8, security platform 100 includes a collector 818 that connects with various tools to extract data related to assets, vulnerabilities, logs, etc. In certain embodiments, when an imaging technique or method is enabled, the collector 818 connects with the API(s) 804 of one or more cloud providers 806H (e.g., CSPs) to carry out the extraction of artifacts related to the asset(s) (e.g., instance(s)) in the monitored CSP accounts. In certain embodiments, the collector 818 is to perform one or any combination of the following functionalities for an imaging technique: (i) obtaining ID(s) related to the instance(s) to be analyzed, (ii) determining OS and version information related to the instance(s) using CSP APIs, (iii) obtaining virtual disk(s) and/or snapshot(s) locations for the instance(s), (iv) triggering processes (e.g., operations) to create, copy, and/or share snapshot(s) for the instance(s), (v) triggering processes (e.g., operations) to obtain memory captures for the instance(s) and/or copying/sharing them, and/or (vi) sending the collected artifacts for further processing and analysis. In certain embodiments, the collector 818 collects (e.g., at a given (e.g., "regular") interval) vulnerability information from various threat intelligence feeds, e.g., and this data is sent for processing/storage in the data store. In certain embodiments, the threat data is further used in the analyzer 822 as it is correlated to the analysis results.

Processor

In certain embodiments, the processor 810 accesses (e.g., receives) the artifacts (e.g., the virtual snapshot(s), memory capture(s) and OS information) sent by the collector 818. In certain embodiments, the processor 810 prepares these artifacts for further analysis. In certain embodiments, this includes preparing a sandbox environment where the artifacts are executed. In certain embodiments, this includes preparing an analyzer 822 virtual instance (e.g., as discussed in reference to FIGS. 11-12) that includes a corresponding analysis tool(s), e.g., where the processor 810 attaches the artifacts to the analyzer 822 instance(s). In certain embodiments, the analyzer(s) 822 are running in the account where the security platform is running, e.g., where the artifacts are to be copied to or shared with the account of the security platform. In certain embodiments, the artifacts are copied or shared with an account trusted by the monitored system, e.g., where the processor 810 is to make the analyzer(s) 822 available to the trusted account. In certain embodiments, the analyzer(s) 822 are running in a different account than the account where the security platform is running.

Thus, the outcome is that certain analyzer(s) (e.g., analyzer virtual instances) are coupled with the artifacts for further analysis in certain embodiments.

Analyzer

In certain embodiments, the analyzer 822 includes several individual analyzer instances (analyzers), e.g., that each include tools to extract information related to the virtual instances of the monitored systems (e.g., monitored instance(s)).

In certain examples, the analyzer 822 is to perform one or any combination of the following analysis functionalities for an imaging technique: (i) obtaining a list of installed applications (e.g., software) and/or packages (e.g., software packages), e.g., and their versions. In certain embodiments, this is obtained by scanning (e.g., certain locations of) the snapshot. In certain embodiments, the analyzer 822 compares the list of installed applications and/or packages against threat intelligence data (e.g., from threat feed 820) to obtain a list of vulnerabilities against these installed applications and/or packages. In certain embodiments where certain applications are running as software containers (e.g., docker container), certain locations on the virtual disk snapshot are parsed to obtain the container names, IDs, and/or other properties related to the containers (e.g., such as exposed ports, attached volumes, network info, etc.).

In certain embodiments, the analyzer 822 compares a known list of file hashes with the file hashes on the snapshot, e.g., where the modified files are used as a starting point to search for patterns that suggest malicious activity. In certain embodiments, the analyzer 822 searches for sensitive information (e.g., such as private keys, clear text passwords, etc.). In certain embodiments, the analyzer 822 uses known public keys and/or related logs to find the login activity on the system. In certain embodiments, the analyzer 822 uses a pattern search to find anomalies, e.g., such as unusual (e.g., cron or periodic) jobs, suspicious start up scripts, suspicious temporary files, etc. In certain embodiments, the analyzer 822 parses one or more log files to look for anomalies.

In certain embodiments, the analyzer 822 obtains data from several sources, e.g., such as assets having personally identifiable information (PII), assets that host critical applications and related vulnerability information (e.g., obtained from static scanners), network activity of the asset (e.g., based on network logs), anomalies detected in network traffic related to the asset, and/or threat intelligence feeds. In certain embodiments, the analyzer 822 correlates that data to identify the vulnerabilities on the monitored asset(s), e.g., without modifying any data and/or without network intervention. In certain embodiments, the analyzer 822 analyzes one or more memory captures to identify the list of running processes, suspicious processes not having a disk image, and/or network related activity, e.g., to gain insight into vulnerabilities which are critical and running on the VM, and/or any malicious programs which do not have a disk image.

Datastore

In certain embodiments, the datastore 826 is used to store the output of the analyzer 822, for example, and that output used for making further inferences on the findings (e.g., by the inferencer 824). In certain embodiments, the analysis is used to trigger remediation actions to resolve the security vulnerabilities and/or other issues identified.

Machine Learning Models (e.g., of Inferencer)

In certain embodiments, the security platform 100 (e.g., inferencer 824) uses one or more machine learning models for further analysis of the findings.

In certain embodiments, the vulnerability findings obtained from the imaging technique are passed through one or more machine learning models to project priorities based on several factors (e.g., such as severity of the finding, age of the finding, current or previous exploitations, software and its priority, exposure of the VM in the environment, criticality of the VM, impact of exploitation, etc.). In certain embodiments, the output of the inferencer 824 (e.g., machine learning model(s) thereof) are priority ratings associated with the vulnerability findings and/or the priority rating for the VM which possesses the vulnerability.

In certain embodiments, a machine learning model associate the vulnerability findings with other security findings, e.g., such as weaknesses, security alerts, anomalous security events, connectivity of VM with other assets within the enterprise environment, critical services associated with the VM, and/or critical applications the VM is associated with. In certain embodiments, all the security findings are placed in the context of the network connectivity maps to predict potential attack vectors in the enterprise environment, e.g., as discussed herein.

Triggering the Imaging Process

In certain embodiments, there are one or more ways to trigger the imaging process. For example, the imaging process may be triggered (i) when a new account or system is added for monitoring, the initial set of asset information could be created, and the imaging process is then started for these assets, (ii) once a list of monitored assets is created, a process can be triggered (for example, at periodic intervals of time, e.g., every 24 hours) that starts the imaging process, (iii) in certain embodiments, the security platform described here also performs anomaly detection on network traffic associated with the monitored assets (e.g., where certain kinds of anomalies that are to be detected include unusual traffic targeted to the VM, unusual traffic targeted to particular services of the VM, suspicious user activity, and/or suspicious events such as security group changes), and any anomalous activity related to the VM is used to trigger the imaging process, e.g., where further analysis determines any malicious activity, and/or (iv) suspicious events such as network access changes, suspicious login activity, unauthorized access could be used as triggers for starting the imaging process.

FIG. 13 is a flow diagram illustrating operations 1300 of a method for predictive analysis of potential attack patterns based on contextual security information including an image according to some embodiments. Some or all of the operations 1300 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1300 are performed by a security platform (or a component thereof) of the other figures. In some embodiments, one or more (or all) of the operations 1300 are performed by a virtual instance or virtual function of a cloud provider.

The operations 1300 include, at block 1302, generating an image for an enterprise that indicates one or more software application stacks of a virtual instance of a cloud provider from an application programming interface of the cloud provider and a network architecture for the one or more software application stacks without installing and utilizing security monitoring software on the cloud provider. The operations 1300 further include, at block 1304, determining one or more vulnerabilities of the one or more software application stacks and one or more vulnerabilities of the network architecture from the image. The operations 1300 further include, at block 1306, providing the one or more vulnerabilities of the one or more software application stacks, and the one or more vulnerabilities of the network architecture as input to a machine learning model. The operations 1300 further include, at block 1308, generating an inference by the machine learning model that indicates one or more attack paths for an attacker in the one or more software application stacks and the network architecture. The operations 1300 further include, at block 1310, transmitting the inference to a storage location or a security software application.

(III) Methods for Prioritizing Security Findings Using Machine Learning Models

Certain embodiments herein are directed to methods for prioritizing security findings using machine learning models.

Certain enterprises are facing an explosion of technologies related to digital transformation, for example, where assets and applications (e.g., software application stacks) are spread across various environments such as cloud, on-premises, private cloud, mobile, internet-of-things (IoT), and/or a combination of software development (Dev) and IT operations (Ops) (DevOps). This rapid growth has also led to an enormous number of security risks associated with the varied environments. Certain methods of calculating risks and managing security issues are unable to handle the deluge of security findings. Identifying and prioritizing security findings is directly related to the amount of remediation efforts and in-turn to the time needed for these efforts. Embodiments herein (e.g., methods and models) allow an enterprise(s) to prioritize various security findings, e.g., to allow for a focus (e.g., by a security platform) on a proper subset of (e.g., the most important) one or more software application stacks of the enterprise. Embodiments herein (e.g., methods and models) allow an enterprise(s) to prioritize various security findings, e.g., to allow for a focus (e.g., by a security platform) on a proper subset of (e.g., the most important) remediation efforts.

In certain embodiments, a security issue is any vulnerability (e.g., and/or a weakness and/or a misconfiguration) identified in assets or applications, e.g., unless explicitly stated/used. In certain embodiments, an asset is any computer, virtual computer, computing device, servers, networking device, infrastructure device, security appliance, and/or mobile device, e.g., used by an enterprise. In certain embodiments, an application is a program (e.g., software) that performs a specific task and typically run on an asset.

In certain embodiments, there are threat intelligence sources, e.g., from a third party relative to an enterprise. In certain embodiments, the threat intelligence sources provide threat intelligence data, for example, where the threat intelligence data is provided under a category system (e.g., and corresponding identifier), e.g., according to a standard. In certain embodiments, threat intelligence data is (i) common vulnerabilities and exposures (CVE) data, e.g., that provides identifiers for vulnerabilities, (ii) common weakness enumeration (CWE) data, e.g., that provides identifiers for software and/or hardware weaknesses, (iii) common vulnerability scoring system (CVSS) data, e.g., a standardized scoring system to score the severity of vulnerabilities, (iv) common weakness scoring system (CWSS) data, e.g., a standardized scoring system to score and prioritize software weaknesses, (iv) common platform enumeration (CPE), e.g., a naming scheme to identify IT systems, operating systems, software, and packages (e.g., used as a machine-readable identifier to indicate a software product name and software version, or any single or combination of these. In certain embodiments, CVEs are associated with CPEs to indicate the software products and versions that the CVE affects.

In certain embodiments, the threat intelligence data includes common vulnerabilities and exposures (CVE) data. In certain embodiments, the common vulnerabilities and exposures data comprises common platform enumeration data, common weakness enumeration data, common vulnerability scoring system data, or any single or combination of these.

In certain embodiments, there are several types of security findings, e.g., including vulnerabilities (e.g., and/or weaknesses and/or misconfigurations). One approach for prioritizing vulnerabilities is the use of CVSS scores and for weaknesses is the use of CWSS scores. In certain embodiments, CVSS scores have three metrics, e.g., base, temporal and environmental. However, in certain embodiments, the usage of temporal and environmental component scores are left to the user of the scores. In certain embodiments, the completeness of the CVSS scores is dependent on the completeness and accuracy of the metrics used. Thus, in certain embodiments, prioritization based on CVSS scores only using the base metrics provides incorrect prioritization results. Also, in certain embodiments, CVSS scores are a reactive measure as they are generated after a vulnerability has been found. In certain embodiments, CWSS scores are a proactive measure of exploitability of a system, as they are based on the weaknesses in the system, e.g., which are discovered early in the development lifecycle. However, certain specifications, e.g., a CWSS specification are not actively updated (e.g., since 2014) and hence might not be a relevant scoring system for use. Certain CWE measures (e.g., Top 25 and Open Web Application Security Project (OWASP) Top Ten) may be a good measure, but do not accommodate temporal and environmental factors in their calculations.

Certain embodiments herein are directed to methods and mechanisms to use factors that project the exploitability of a vulnerability (e.g., and/or a weakness). Certain embodiments herein are directed to methods and mechanisms to combine multiple types of threat intelligence data (e.g., from different threat intelligence sources) (e.g., to combine CWE data with CVSS data) to provide a proactive method that predicts the exploitability of security findings and of the software application stack(s) (e.g., software) involved.

CVE, CWE and CPE

Figure 14:
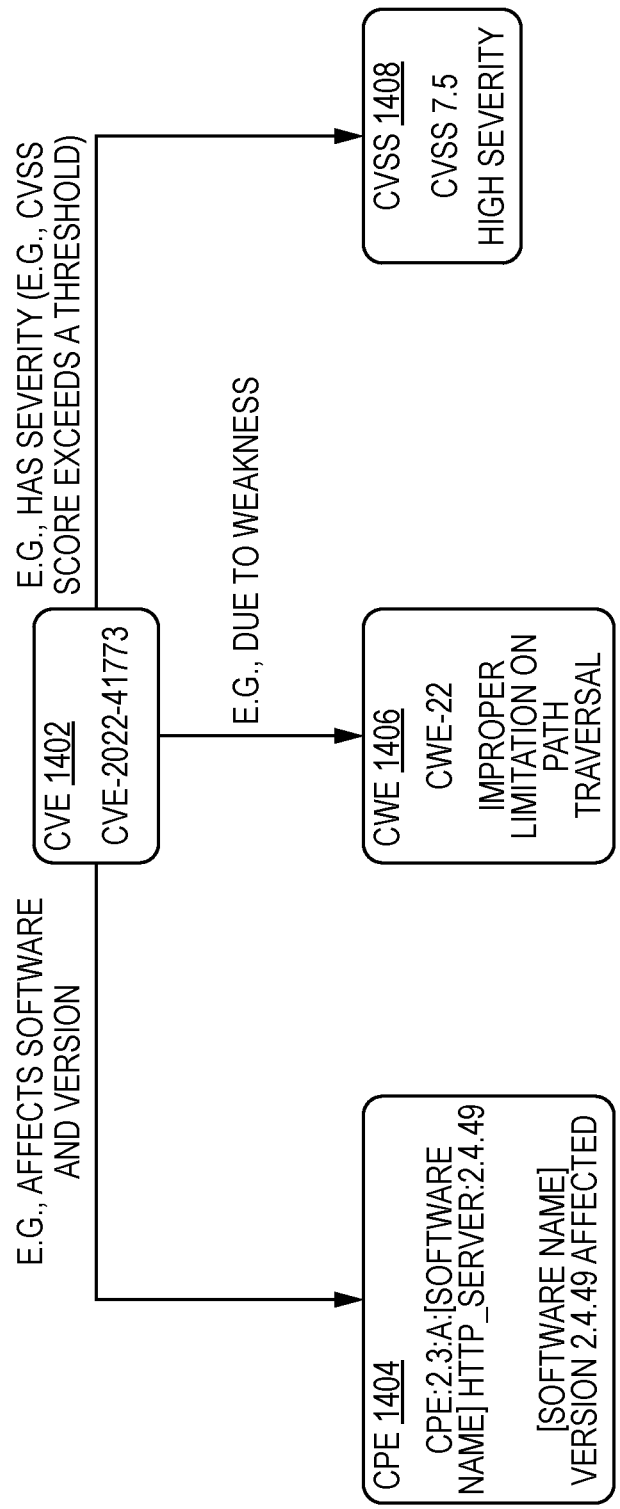
FIG. 14 is a block diagram illustrating a common platform enumeration (CPE) identifier, a common weakness enumeration (CWE) identifier, and a common vulnerability scoring system (CVSS) identifier that are associated with a single common vulnerabilities and exposures (CVE) identifier and the relationships therebetween according to some embodiments.

In certain embodiments, CVE is an instance of a CWE where a vulnerability is associated with a hardware and/or software product and the hardware and/or software product can be identified by a CPE, and hence the CVE can also be associated with a CPE. In certain embodiments, CVEs have a severity rating, e.g., provided as a CVSS score. FIG. 14 is a sample representation of the relation between CVE, CWE and CPE.

In certain embodiments, identifying and defining the relations between multiple types of threat intelligence data (e.g., from different threat intelligence sources) (e.g., the corresponding identifiers) provides a rich feature set that is input into a machine learning model, e.g., to the model infers the exploitability (e.g., a corresponding exploitability score) of each of the threat intelligence data (e.g., CVE, CWE and CPE). Example feature sets and processes are further described below.

FIG. 14 is a block diagram illustrating a common platform enumeration (CPE) identifier 1404, a common weakness enumeration (CWE) identifier 1406, and a common vulnerability scoring system (CVSS) identifier 1408 that are associated with a single common vulnerabilities and exposures (CVE) identifier 1402 and the relationships therebetween according to some embodiments. Thus, in certain embodiments, a security platform (e.g., security platform 100 herein) (e.g., a machine learning model thereof) is to associate (e.g., identify and/or define) the relations between multiple types of threat intelligence data, e.g., to infer the exploitability (e.g., a corresponding exploitability score) of each of the threat intelligence data (e.g., CVE, CWE and CPE).

Vulnerability Factors

In certain embodiments, software vulnerabilities are flaws that could be exploited to take over the system that is running the software. In some embodiments, certain programs (e.g., referred to as "exploits") are developed to exploit vulnerabilities. In certain embodiments where a vulnerability(ies) affects certain software, the vendor of the software publishes an update and/or other remediation suggestions to prevent exploitation, e.g., such that applying the patches or remediations would mitigate the risks associated with the vulnerabilities. Thus, the availability of exploits and/or remediations changes the risk associated with a vulnerability. In certain embodiments, exploits and remediations are time-bound and thus increase or decrease in risk over time. For example, an exploit for a multiple (e.g., 5) year old vulnerability might not be relevant anymore and hence the risk of the vulnerability is lower. On the other hand, non-availability of a patch for a new vulnerability would increase the risk as an exploit is imminent in certain embodiments. In certain embodiments, the age of a vulnerability plays a role as a threat actor might want to target newer vulnerabilities, e.g., for which remediations might not exist or have not been implemented.

In certain embodiments, the popularity of the software affected by the vulnerability would also play a role. Popularity could be defined by several characteristics such as number of instances of software deployed, number of past vulnerabilities, number of active exploits, number of versions of the software (e.g., which indicate the frequency of updates needed), vendor of the software (e.g., where certain vendor(s) are frequently targeted), number of remote exploits (e.g., certain vendor(s) are targeted less frequently, e.g., a vendor that is closed source and is hard to exploit). Thus, certain threat actors want to target software which is popular and hence are better (e.g., easier) targets.

Vulnerability Features

In certain embodiments, the set of one or more features used to define the exploitability of a vulnerability are broadly categorized into the following: (i) vulnerability characteristics, (ii) time-based exploitability, (iii) sources of exploitability, (iv) vendor metrics, (v) code vulnerabilities (e.g., weakness metrics), (vi) other metrics, or any single or combination of these. In certain embodiments, the values associated with a feature can be binary (e.g., 0 or 1), numeric value (e.g., whole numbers), or can be descriptive words. In certain embodiments where (e.g., English) words are used, various natural language processing algorithms are employed to extract the most relevant words describing the category, impact, efficacy, and/or other characteristics of the vulnerability.

FIG. 15 is a block diagram illustrating vulnerability features 1500 according to some embodiments. In FIG. 15, the categories of vulnerability features 1500 include (i) vulnerability characteristics 1502, (ii) time-based exploitability 1504, (iii) sources of exploitability 1506, (iv) vendor metrics 1508, (v) code vulnerabilities 1510 (e.g., weakness metrics), and (vi) other metrics 1512.

Vulnerability characteristics 1502 may include one or any combination of: command execution, an indication that a vulnerability is exploited in the "wild" (e.g., publicly exploited), a command injection (e.g., cmd-string), exception handling, or a web application framework. Time-based exploitability 1504 may include one or any combination of: time since vulnerability published, time since first known exploit, time since first known mitigation, time since first known remediation, time since a related issue was exploited, or time since the software was exploited recently. Sources of exploitability 1506 may include one or any combination of: exploited widely, number of external references, number of exploit links, number of vendor links, number of published advisories, or number of dependent vulnerabilities. Vendor metrics 1508 may include one or any combination of: number of software affected, number of software versions affected, popularity of software affected, or number of vendors affected. Code vulnerabilities 1510 (e.g., weakness metrics) may include one or any combination of: number of related weaknesses, number of instances of weaknesses that were exploited, or number of vulnerabilities associated with the weakness. Other metrics 1512 may include one or any combination of: base severity score of vulnerability, type of software (e.g., web or database), typical zone where software is deployed (e.g., web or behind a firewall (e.g., behind a DMZ)), or the impact.

Code Vulnerabilities (e.g., Weaknesses and Software Product Features)

Similar to the features defined for vulnerabilities, certain embodiments here define features for weaknesses and/or software products and feed them to machine learning models, e.g., to determine a corresponding vulnerability score for the weaknesses and/or software products. For example, the exploitability of each of those to help prioritize remediating them.

For weaknesses, some of the potential features (e.g., code vulnerabilities 1510) are: (i) number of vulnerabilities associated, (ii) number of vulnerabilities that were exploited, (iii) likeliness of exploitation (e.g., as a percentage of vulnerabilities exploited to total associated vulnerabilities), (iv) prevalence of issue (e.g., a number of applications affected), (v) privileges required, (vi) impact of issue (e.g., crash, exit, denial-of-service, or code execution), (vii) number of languages affected, (viii) number of platforms affected, (ix) number of potential mitigations, (x) number of (e.g., easily) implementable mitigations, (xi) detection methods (e.g., static scans, dynamic scans, software composition analysis, etc.), or (xii) number of related weaknesses (where a threat intelligence source identifies relations for weaknesses, e.g., such as parent or child, can follow).

For products, some of the potential features (e.g., vendor metrics 1508) are: (i) product name, (ii) product version, (iii) total number of product versions released to date, (iv) total number of vulnerabilities associated, (v) total number of vulnerabilities exploited, (vi) time since recent wide exploitation of product, (vii) vendor name, (viii), vendor popularity based on vulnerability count, (ix) typical location of product (e.g., such as in web, firewall, infrastructure), or (x) open source or closed source.

Architecture

Figure 16:
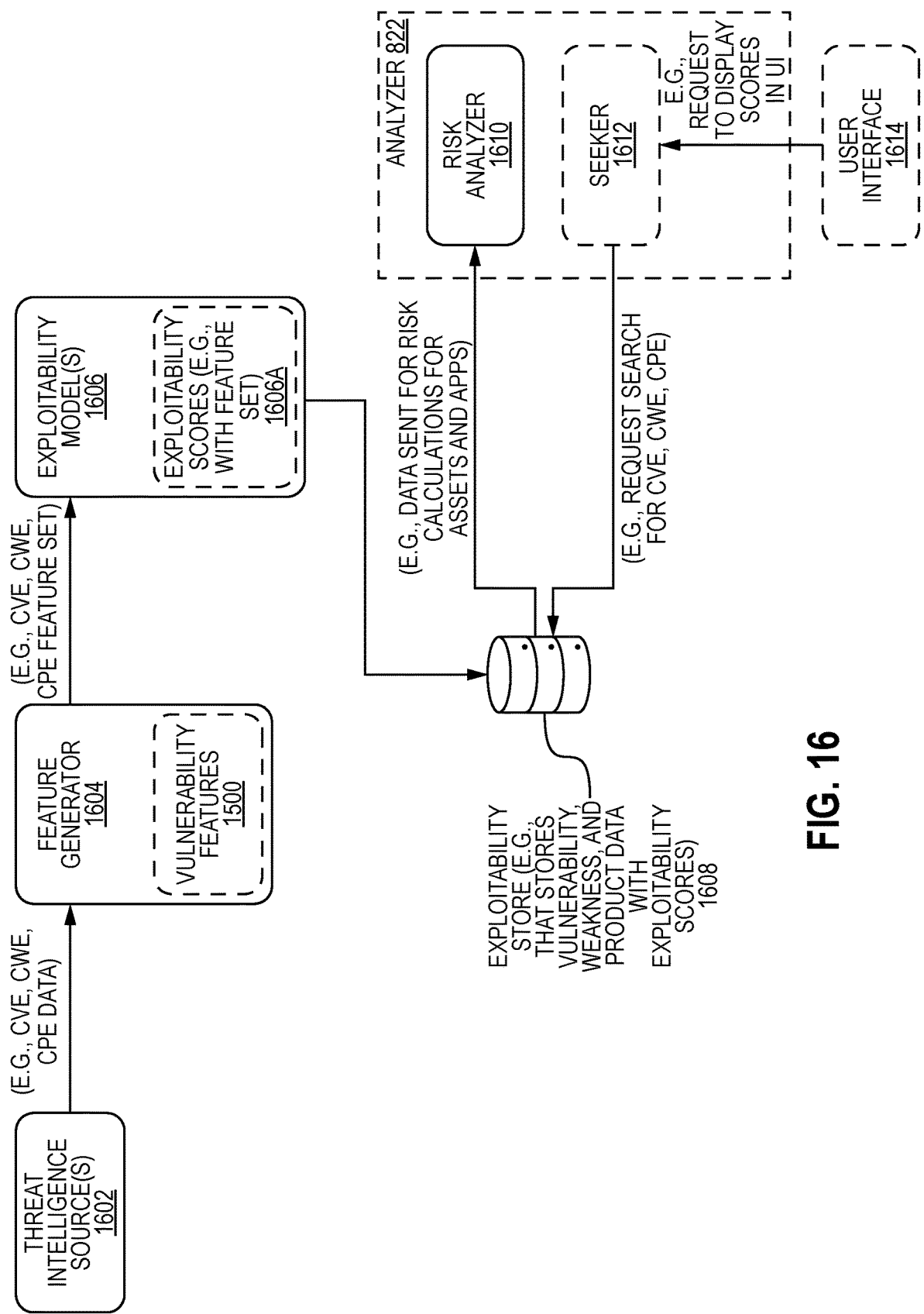
FIG. 16 is a block diagram illustrating an exploitability machine learning model to generate one or more exploitability scores based on an input of one or more vulnerability features according to some embodiments.

FIG. 16 depicts the architecture of a system that takes in data (e.g., CVE, CWE, and CPE data) from threat intelligence sources and generates exploitability scores. In certain embodiments, these exploitability scores are used by a security platform (e.g., security platform 100 in the FIGS.), e.g., for it to generate risk scores and to display the scores to help with prioritization.

FIG. 16 is a block diagram illustrating an exploitability machine learning model 1606 to generate one or more exploitability scores based on an input of one or more vulnerability features (e.g., one or more of the vulnerability features 1500 from FIG. 15) according to some embodiments. In certain embodiments, threat intelligence source(s) 1602 are monitored, and the corresponding data is sent to feature generator 1604, e.g., to generate one or more sets (e.g., vectors) of vulnerability features (e.g., one or more of the vulnerability features 1500 from FIG. 15). In certain embodiments, the one or more sets (e.g., vectors) of vulnerability features are input into a machine learning model 1606 (or ensemble of machine learning models) that is trained to generate a corresponding exploitability score 1606A. In certain embodiments, the set of exploitability scores 1606A (e.g., mapped to a corresponding vulnerability (e.g., and/or a corresponding weakness and/or a corresponding misconfiguration) may then be used, e.g., to prioritize which of those vulnerabilities (e.g., and/or a weaknesses and/or misconfigurations) are to be selected for analyzation, e.g., by security platform (e.g., security platform 100 as shown in FIG. 8). In certain examples, the prioritization is (e.g., from highest to lowest prioritization): (1) a critical vulnerability which is being actively exploited (e.g., "in the wild"), (2) a high vulnerability with an active exploit (e.g., that can lead to command execution) and (3) vulnerability affecting multiple vendors and multiple products (e.g., in a library).

In certain embodiments, the security platform is to monitor one or more threat intelligence sources 1602, e.g., by the threat feed 820 in FIG. 8. In certain embodiments, the security platform (e.g., system) continually keeps drawing data from a plurality of (e.g., various) threat intelligence sources 1602. In certain embodiments, the threat intelligence sources include one or any combination of: a national vulnerability database (NVD) (e.g., a repository of CVEs and CPEs with detailed data that helps with vulnerability management and/or that includes CVSS base scores), a CWE list (e.g., a list of software and hardware weakness types with identifiers and/or a top 25 list of CWSS scores), an exploit database (e.g., a database of exploits against various software vendors) (e.g., where the exploit appears here before a CVE entry is created), a Metasploit database (e.g., a database of exploits used in the Metasploit framework), sources listed as exploit sources in NVD, sources listed as vendor advisories in NVD, sources listed as third-party advisories in NVD, Cybersecurity & Infrastructure Security Agency (CISA) database (e.g., a data base of known exploited vulnerabilities), a crowd-sourced project that provides feeds to provide information about security happenings (e.g., AttackerKB), security blogs, vulnerability disclosures, or forums.

In certain embodiments, the threat intelligence sources are webpages and web scraping (or elaborate natural language processing techniques) are used to extract the keywords and relevant words. In certain cases, certain keywords or texts could be provided through APIs (e.g., an APIs to obtain CVE and/or CPE data).

In certain embodiments, the feature generator 1604 generates vulnerability features 1500 related to threat intelligence data (e.g., features related to CVE, CWE and CPE as discussed herein). In certain embodiments, these vulnerability features 1500 are fed to the machine learning models both as training and as input data. In certain embodiments, the training data is generated from a subset of all the threat intelligence data (e.g., CVE, CWE and CPE data) with a collection of features related to each, for example, where at the end of the training period of the machine learning model, an exploitability score is generated that indicates the level of exploitability of a security finding (e.g., even if an exploit is currently not present). In certain embodiments, the feature generator 1604 then generates a corresponding set of features for a larger input data. In certain embodiments, when the vulnerability features 1500 data is passed to the machine learning exploitability model 1606, it provides a prediction on the exploitability (e.g., via a corresponding exploitability score), e.g., an exploitability score of the vulnerability, weakness, product, etc.

Exploitability Machine Learning Model

In certain embodiments, the exploitability model(s) 1606 use one or more of various machine learning models to predict the exploitability from threat intelligence data (e.g., features thereof) (e.g., CVE, CWE and CPE data). Example models include classification models, linear regression models that would help establish the correlation between the features provided and a prediction on the level of exploitability from threat intelligence data (e.g., features thereof) (e.g., the exploitability of the CVE, CWE and CPE). Examples of prediction models include random forest, decision tree learning, artificial neural network, and Bayesian networks. One or more of these ML models could be used to provide a prediction score on the exploitability. In certain embodiments, the output generated by the models could in turn be stored into a database 1608. In certain embodiments, the stored output includes one or more of: the threat intelligence data (e.g., CVE, CWE and CPE information), the associated feature set (e.g., vulnerability features 1500 thereof), and the predictive scores of exploitability.

In certain embodiments, the architecture includes a risk analyzer 1610 (e.g., to generate a risk score and/or risk report 832 according to the disclosure herein) and/or a seeker 1612 (e.g., to respond to a request (e.g., from a GUI 1614) to display the exploitability scores) to search the database 1608 for vulnerability scores for corresponding threat intelligence data (e.g., CVE, CWE and CPE information).

In certain embodiments, one or more of these components are implemented by the analyze 106 in FIG. 1 or the security platform 100 (e.g., in FIG. 8). For example, in certain embodiments, the risk analyzer 1610 and/or seeker 1612 are implemented by analyzer 822 in FIG. 8 (e.g., where the UI utilizes the API 828 in FIG. 8).

In certain embodiments, an enterprise environment had a collection of assets, applications, and software products. In certain embodiments, several instances of threat intelligence data (e.g., CVEs and CWEs) may be associated with each of these components. However, the challenge in certain enterprises is the prioritization of these issues.

Embodiments herein utilize the predicted exploitability scores to determine a prioritization, e.g., determine a proper subset of a software application stack (e.g., and its assets) to perform an analyzation on.

Additionally, there might be other factors such as the exposure of an asset (e.g., public facing), application environment (e.g., production) that might affect the risk associated with the assets and applications. In order to focus on the critical assets and apps, the risk analyzer 1610 in certain embodiments takes the input from the models 1606 (directly or by using the database 1608) and applies other factors associated with assets and applications to calculate the risk score (e.g., risk rating) for the assets, applications, products, etc. In certain embodiments, the risk score is generated by the inferencer 824 in FIG. 8 (e.g., and/or the attack inference and mitigation engine 112).

In certain embodiments, seeker 1612 is part of the analyzer 822 engine of security platform 100. In certain embodiments of the security platform 100, once the assets information has been collected, the software and software versions are either retrieved (e.g., using tools such as vulnerability scanners) or are discovered (e.g., using imaging technique (e.g., in the cloud)). In certain embodiments, once the software and version information are gathered, the seeker 1612 searches through the exploitability store (e.g., database) 1608 based on this data, e.g., either directly or by generating a threat intelligence data (e.g., CPE formatted) identification.

In certain embodiments, the output returned by seeker 1612 is a list of associated threat intelligence data (e.g., CVEs) and their exploitability scores, e.g., along with some of the feature data used in those calculations.

In certain embodiments, the seeker 1612 searches based on the application that is deployed on the asset. For example, where the output returned is a list of relevant threat intelligence data (e.g., CWEs) and their associated exploitability scores, e.g., along with some of the feature data used in the calculations.

In certain embodiments, both the scores(e.g., CVE score and CWE score) are further correlated to prioritize remedial actions for the assets and apps.

In certain embodiments, threat intelligence data (e.g., CPE, CVE and CWE information) along with the exploitability scores (e.g., and any related data from the feature set) is displayed in the user interface. In certain embodiments (e.g., where a user of the security platform is a security officer), the component scores (e.g., base scores, impact scores, and/or exploitability scores) used in calculation could also be shown. In certain embodiments, the user interface 1614 is a graphical user interface (GUI) or APIs could be provided by the platform for the end user to retrieve information of interest.

Figure 17:
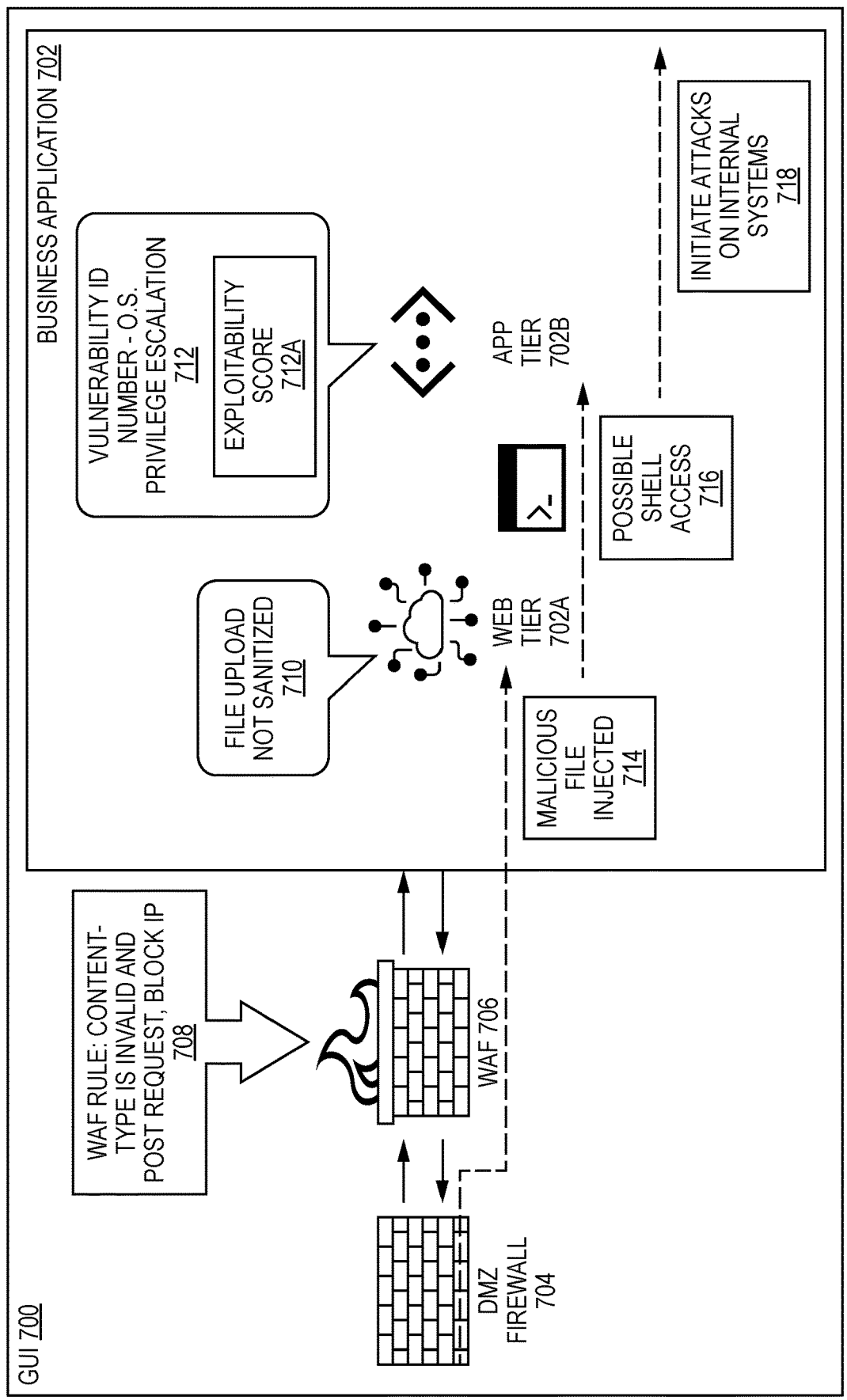
FIG. 17 is a diagram illustrating the graphical user interface of FIG. 7 including an exploitability score for the corresponding vulnerability according to some embodiments.

FIG. 17 is a diagram illustrating the graphical user interface of FIG. 7 including an exploitability score 712A for the corresponding vulnerability 712 according to some embodiments.

FIG. 18 is a flow diagram illustrating operations 1800 of a method for generating one or more exploitability scores by a first machine learning model based at least in part on an input of one or more vulnerability features of one or more software application stacks, determining a proper subset of the one or more software application stacks based at least in part on the one or more exploitability scores, and generating a predictive analysis of potential attack patterns by a second machine learning model based at least in part on an input of the proper subset of the one or more software application stacks according to some embodiments. Some or all of the operations 1800 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1800 are performed by a security platform (or a component thereof) of the other figures. In some embodiments, one or more (or all) of the operations 1800 are performed by a virtual instance or virtual function of a cloud provider.

The operations 1800 include, at block 1802, generating a profile for an enterprise that indicates one or more software application stacks and a network architecture for the one or more software application stacks. The operations 1800 further include, at block 1804, determining one or more vulnerability features of the one or more software application stacks. The operations 1800 further include, at block 1806, generating one or more exploitability scores by a first machine learning model based at least in part on the one or more vulnerability features. The operations 1800 further include, at block 1808, determining a proper subset of the one or more software application stacks based at least in part on the one or more exploitability scores. The operations 1800 further include, at block 1810, determining one or more vulnerabilities of the proper subset of the one or more software application stacks and one or more vulnerabilities of the network architecture. The operations 1800 further include, at block 1812, providing the one or more vulnerabilities of the proper subset of the one or more software application stacks, the one or more vulnerabilities of the network architecture, and the profile as input to a second machine learning model. The operations 1800 further include, at block 1814, generating an inference by the second machine learning model that indicates one or more attack paths for an attacker in the proper subset of the one or more software application stacks and the network architecture. The operations 1800 further include, at block 1816, transmitting the inference to a storage location or a security software application.

(IV) Risk Scoring for Applications Based on Historical, Predictive, and Inherent Factors Certain embodiments herein are directed to risk scoring for applications based on historical, predictive, and inherent factors.

With the numerous security vulnerabilities existing today, it is hard to proactively identify and patch them. In order to prioritize remediation and mitigation efforts, risk scores are used in certain embodiments. In certain embodiments herein, the score calculation uses several factors such as, but not limited to, a Common Vulnerability Scoring System (CVSS) rating which forms the base score. In certain embodiments, the exposure of the application is weighted in to further adjust the score. Temporal factors such as age of exploit, effectiveness of exploit and active exploitation are used in determining the risk score in certain embodiments. In addition, in certain embodiments, the risk score is determined based on connectivity between various components of the application and the exploitability of those components. In certain embodiments, if security controls or remediations exist in the application environment, the information is used to adjust the risk score accordingly. Thus, such a calculated score is used to prioritize patching and mitigation efforts in certain embodiments.

(V) Methods for Proposing Counter Measures for Security Vulnerabilities Using Contextual and Attack Prediction Patterns Certain embodiments herein are directed to methods for proposing counter measures for security vulnerabilities using contextual and attack prediction patterns.

Certain embodiments herein, using the context built around applications and the various entities involved, attack patterns could be identified, and attack paths predicted. However, an organization might not have security controls to stop the attacks and/or their controls might be insufficient. Based on the application contextual information, certain embodiments herein propose counter measure(s) to defend against the attacks. In certain embodiments, these measures are implemented through security devices and/or applications present in an environment.

At least some embodiments of the disclosed technologies can be described in view of the following examples:

Example 1. A computer-implemented method comprising:
generating a profile for an enterprise that indicates one or more software application stacks and a network architecture for the one or more software application stacks;
determining one or more vulnerabilities of the one or more software application stacks and one or more vulnerabilities of the network architecture;
providing the one or more vulnerabilities of the one or more software application stacks, the one or more vulnerabilities of the network architecture, and the profile as input to a machine learning model;
generating an inference by the machine learning model that indicates one or more attack paths for an attacker in the one or more software application stacks and the network architecture; and
transmitting the inference to a storage location or a security software application.

Example 2. The computer-implemented method of example 1, wherein the profile indicates a web tier, an application tier, a firewall, and a database of the one or more software application stacks.

Example 3. The computer-implemented method of example 1, further comprising generating, based at least in part on the inference, a risk score of assets of the network architecture and the one or more software application stacks.

Example 4. The computer-implemented method of example 1, further comprising generating, based at least in part on the inference, a binary compliance status of assets of the network architecture and the one or more software application stacks.

Example 5. The computer-implemented method of example 1, further comprising:
determining a remediation based at least in part on the inference that indicates the one or more attack paths for the attacker, and
causing the remediation to be implemented for the enterprise.

Example 6. The computer-implemented method of example 5, further comprising displaying, by a graphical user interface, the one or more attack paths with an indication of a corresponding remediation for each attack path to the enterprise.

Example 7. The computer-implemented method of example 1, wherein deployment of the one or more software application stacks is on a private cloud of the enterprise and a public cloud.

Example 8. The computer-implemented method of example 1, further comprising displaying, by a graphical user interface, the one or more attack paths with an indication of a corresponding vulnerability for each attack path to the enterprise.

Example 9. The computer-implemented method of example 1, wherein the determining comprises:
generating an image of one or more virtual machines of a public cloud executing the one or more software application stacks; and
determining the one or more vulnerabilities of the one or more software application stacks from the image.

Example 10. The computer-implemented method of example 9, wherein the machine image comprises an indication of an installed operating system, installed application packages, software running, services running, applications associated with the services, and containers running on the one or more virtual machines.

Example 11. A computer-implemented method comprising:
generating a profile for an enterprise that indicates one or more software application stacks and a network architecture for the one or more software application stacks;
determining one or more vulnerabilities of the one or more software application stacks and one or more vulnerabilities of the network architecture;
determining one or more anomalies within network traffic of the network architecture;
providing the one or more vulnerabilities of the one or more software application stacks, the one or more vulnerabilities of the network architecture, the one or more anomalies within network traffic of the network architecture, and the profile as input to a machine learning model;
generating an inference by the machine learning model that indicates one or more attack paths for an attacker in the one or more software application stacks and the network architecture; and
transmitting the inference to a storage location or a security software application.

Example 12. The computer-implemented method of example 11, wherein the determining the one or more anomalies within the network traffic of the network architecture comprises inferring the one or more anomalies by a second machine learning model.

Example 13. The computer-implemented method of example 12, further comprising, before the inferring by the second machine learning model, training the second machine learning model to detect a plurality of anomalies, within network traffic, comprising a host port scan of all ports on a host from a same source, a network port scan of several ports on several hosts from a same source, a network scan that detects active hosts in a network of the network architecture, too high or too low of activity for a destination Internet Protocol (IP) address, too high or too low of activity for a destination port, an unexpected activity at a particular time for an IP address, and an unexpected high network activity within the network.

Example 14. The computer-implemented method of example 11, further comprising generating, based at least in part on the inference, a binary compliance status of assets of the network architecture and the one or more software application stacks.

Example 15. The computer-implemented method of example 11, further comprising:
determining a remediation based at least in part on the inference that indicates the one or more attack paths for the attacker, and
causing the remediation to be implemented for the user.

Example 16. The computer-implemented method of example 15, further comprising displaying, by a graphical user interface, the one or more attack paths with an indication of a corresponding remediation for each attack path to the user.

Example 17. The computer-implemented method of example 11, wherein deployment of the one or more software application stacks is on a private cloud of the user and a public cloud.

Example 18. The computer-implemented method of example 11, further comprising displaying, by a graphical user interface, the one or more attack paths with an indication of a corresponding vulnerability and a corresponding anomaly for the one or more attack paths to the user.

Example 19. The computer-implemented method of example 11, wherein the determining comprises:
generating an image of one or more virtual machines of a public cloud executing the one or more software application stacks; and
determining the one or more vulnerabilities of the one or more software application stacks from the image.

Example 20. The computer-implemented method of example 19, wherein the image comprises an indication of an installed operating system, installed application packages, software running, services running, applications associated with the services, and containers running on the one or more virtual machines.

Example 21. A computer-implemented method comprising:
generating an image for an enterprise that indicates one or more software application stacks of a virtual instance of a cloud provider from an application programming interface of the cloud provider and a network architecture for the one or more software application stacks without installing and utilizing security monitoring software on the cloud provider;
determining one or more vulnerabilities of the one or more software application stacks and one or more vulnerabilities of the network architecture from the image;
providing the one or more vulnerabilities of the one or more software application stacks, and the one or more vulnerabilities of the network architecture as input to a machine learning model;
generating an inference by the machine learning model that indicates one or more attack paths for an attacker in the one or more software application stacks and the network architecture; and
transmitting the inference to a storage location or a security software application.

Example 22. The computer-implemented method of example 21, wherein the generating the image comprises performing a memory capture of the virtual instance of the cloud provider.

Example 23. The computer-implemented method of example 22, wherein the performing the memory capture of the virtual instance of the cloud provider comprises:
creating a machine image of the virtual instance and sharing it with a trusted account;
creating a test instance from the machine image and isolating the test instance by removing its network access;
logging in to the test instance and creating the memory capture of the virtual instance from memory of the test instance;
uploading the memory capture to a trusted source; and
terminating the test instance.

Example 24. The computer-implemented method of example 23, wherein the memory capture of the memory of the test instance includes a memory capture of a virtual hard disk and a memory capture of a virtual random access memory (RAM) of the test instance.

Example 25. The computer-implemented method of example 22, wherein the performing the memory capture of the virtual instance of the cloud provider comprises:
creating a virtual disk;

mounting the virtual disk with the virtual instance; and
creating the memory capture of the virtual instance from the virtual disk.

Example 26. The computer-implemented method of example 25, wherein the memory capture of the memory of the virtual instance includes a memory capture of a virtual hard disk and a memory capture of a virtual random access memory (RAM) of the virtual instance.

Example 27. The computer-implemented method of example 22, wherein the performing the memory capture of the virtual instance of the cloud provider comprises:
creating a plurality of virtual disks;
mounting the plurality of virtual disks with the virtual instance; and
creating the memory capture of the virtual instance from the plurality of virtual disks.

Example 28. The computer-implemented method of example 21, wherein the generating the image is without changing a state of the virtual instance (e.g., without writing and/or modifying disk state and/or RAM state of the virtual instance).

Example 29. The computer-implemented method of example 21, wherein the generating the image includes determining an operating system of the virtual instance.

Example 30. The computer-implemented method of example 21, wherein the generating the image includes determining any installed software application packages, currently running software, and containers running on the virtual instance.

Example 31. A computer-implemented method comprising:
generating an image for an enterprise that indicates one or more software application stacks of a virtual instance of a cloud provider from an application programming interface of the cloud provider and a network architecture for the one or more software application stacks without installing and utilizing security monitoring software on the cloud provider;
determining one or more vulnerabilities of the one or more software application stacks and one or more vulnerabilities of the network architecture from the image;
determining one or more anomalies within network traffic of the network architecture;
providing the one or more vulnerabilities of the one or more software application stacks, the one or more vulnerabilities of the network architecture, and the one or more anomalies within network traffic of the network architecture as input to a machine learning model;
generating an inference by the machine learning model that indicates one or more attack paths for an attacker in the one or more software application stacks and the network architecture; and
transmitting the inference to a storage location or a security software application.

Example 32. The computer-implemented method of example 31, wherein the generating the image comprises performing a memory capture of the virtual instance of the cloud provider.

Example 33. The computer-implemented method of example 32, wherein the performing the memory capture of the virtual instance of the cloud provider comprises:
creating a machine image of the virtual instance and sharing it with a trusted account;
creating a test instance from the machine image and isolating the test instance by removing its network access;
logging in to the test instance and creating the memory capture of the virtual instance from memory of the test instance;
uploading the memory capture to a trusted source; and
terminating the test instance.

Example 34. The computer-implemented method of example 33, wherein the memory capture of the memory of the test instance includes a memory capture of a virtual hard disk and a memory capture of a virtual random access memory (RAM) of the test instance.

Example 35. The computer-implemented method of example 32, wherein the performing the memory capture of the virtual instance of the cloud provider comprises:
creating a virtual disk;
mounting the virtual disk with the virtual instance; and
creating the memory capture of the virtual instance from the virtual disk.

Example 36. The computer-implemented method of example 35, wherein the memory capture of the memory of the virtual instance includes a memory capture of a virtual hard disk and a memory capture of a virtual random access memory (RAM) of the virtual instance.

Example 37. The computer-implemented method of example 32, wherein the performing the memory capture of the virtual instance of the cloud provider comprises:
creating a plurality of virtual disks;
mounting the plurality of virtual disks with the virtual instance; and
creating the memory capture of the virtual instance from the plurality of virtual disks.

Example 38. The computer-implemented method of example 31, wherein the generating the image is without changing a state of the virtual instance (e.g., without writing and/or modifying disk state and/or RAM state of the virtual instance).

Example 39. The computer-implemented method of example 31, wherein the generating the image includes determining an operating system of the virtual instance.

Example 40. The computer-implemented method of example 31, wherein the generating the image includes determining any installed software application packages, currently running software, and containers running on the virtual instance.

Example 41. A computer-implemented method comprising:
generating a profile for an enterprise that indicates one or more software application stacks and a network architecture for the one or more software application stacks;
determining one or more vulnerability features of the one or more software application stacks;
generating one or more exploitability scores by a first machine learning model based at least in part on the one or more vulnerability features;
determining a proper subset of the one or more software application stacks based at least in part on the one or more exploitability scores;
determining one or more vulnerabilities of the proper subset of the one or more software application stacks and one or more vulnerabilities of the network architecture;

providing the one or more vulnerabilities of the proper subset of the one or more software application stacks, the one or more vulnerabilities of the network architecture, and the profile as input to a second machine learning model;

generating an inference by the second machine learning model that indicates one or more attack paths for an attacker in the proper subset of the one or more software application stacks and the network architecture; and transmitting the inference to a storage location or a security software application.

Example 42. The computer-implemented method of example 41, wherein the determining the one or more vulnerability features further comprises determining one or more vulnerability features of the network architecture.

Example 43. The computer-implemented method of example 42, further comprising determining a proper subset of assets of the network architecture based at least in part on the one or more exploitability scores, wherein the determining the one or more vulnerabilities of the network architecture is determining the one or more vulnerabilities of the proper subset of assets of the network architecture, the providing the one or more vulnerabilities of the network architecture is providing the one or more vulnerabilities of the proper subset of assets of the network architecture, and the generating the inference by the second machine learning model indicates the one or more attack paths for the attacker in the proper subset of the one or more software application stacks and the proper subset of assets of the network architecture.

Example 44. The computer-implemented method of example 41, further comprising accessing threat intelligence data from one or more threat intelligence sources, wherein the determining the one or more vulnerability features of the one or more software application stacks is based at least in part on the threat intelligence data.

Example 45. The computer-implemented method of example 44, wherein the threat intelligence data comprises common vulnerabilities and exposures data.

Example 46. The computer-implemented method of example 44, wherein the common vulnerabilities and exposures data comprises common platform enumeration data, common weakness enumeration data, and common vulnerability scoring system data.

Example 47. The computer-implemented method of example 41, wherein the one or more vulnerability features comprise vulnerability characteristics, time-based exploitability, sources of exploitability, vendor metrics, and weakness metrics.

Example 48. The computer-implemented method of example 41, wherein the one or more vulnerability features comprise vulnerability characteristics, time-based exploitability, sources of exploitability, vendor metrics, or weakness metrics.

Example 49. The computer-implemented method of example 41, further comprising displaying, by a graphical user interface, the one or more vulnerabilities of the proper subset of the one or more software application stacks and a corresponding exploitability score.

Example 50. The computer-implemented method of example 49, further comprising displaying, by the graphical user interface, the one or more attack paths and a risk score (e.g., separate and/or different from any exploitability score) for each attack path to the enterprise.

Example 51. A computer-implemented method comprising:

generating a profile for an enterprise that indicates one or more software application stacks and a network architecture for the one or more software application stacks;

determining one or more vulnerability features of the one or more software application stacks;

generating one or more exploitability scores by a first machine learning model based at least in part on the one or more vulnerability features;

determining a proper subset of the one or more software application stacks based at least in part on the one or more exploitability scores;

determining one or more vulnerabilities of the proper subset of the one or more software application stacks and one or more vulnerabilities of the network architecture;

determining one or more anomalies within network traffic of the network architecture;

providing the one or more vulnerabilities of the proper subset of the one or more software application stacks, the one or more vulnerabilities of the network architecture, the one or more anomalies within the network traffic of the network architecture, and the profile as input to a second machine learning model;

generating an inference by the second machine learning model that indicates one or more attack paths for an attacker in the proper subset of the one or more software application stacks and the network architecture; and transmitting the inference to a storage location or a security software application.

Example 52. The computer-implemented method of example 51, wherein the determining the one or more anomalies within the network traffic of the network architecture comprises inferring the one or more anomalies by a third machine learning model.

Example 53. The computer-implemented method of example 51, wherein the determining the one or more vulnerability features further comprises determining one or more vulnerability features of the network architecture.

Example 54. The computer-implemented method of example 53, further comprising determining a proper subset of assets of the network architecture based at least in part on the one or more exploitability scores, wherein the determining the one or more vulnerabilities of the network architecture is determining the one or more vulnerabilities of the proper subset of assets of the network architecture, the providing the one or more vulnerabilities of the network architecture is providing the one or more vulnerabilities of the proper subset of assets of the network architecture, and the generating the inference by the second machine learning model indicates the one or more attack paths for the attacker in the proper subset of the one or more software application stacks and the proper subset of assets of the network architecture.

Example 55. The computer-implemented method of example 51, further comprising accessing threat intelligence data from one or more threat intelligence sources, wherein the determining the one or more vulnerability features of the one or more software application stacks is based at least in part on the threat intelligence data.

Example 56. The computer-implemented method of example 55, wherein the threat intelligence data comprises common vulnerabilities and exposures data.

Example 57. The computer-implemented method of example 55, wherein the common vulnerabilities and exposures data comprises common platform enumeration data, common weakness enumeration data, and common vulnerability scoring system data.

Example 58. The computer-implemented method of example 51, wherein the one or more vulnerability features comprise vulnerability characteristics, time-based exploitability, sources of exploitability, vendor metrics, and weakness metrics.

Example 59. The computer-implemented method of example 51, wherein the one or more vulnerability features comprise vulnerability characteristics, time-based exploitability, sources of exploitability, vendor metrics, or weakness metrics.

Example 60. The computer-implemented method of example 51, further comprising displaying, by a graphical user interface, the one or more vulnerabilities of the proper subset of the one or more software application stacks and a corresponding exploitability score.

Example 61. The computer-implemented method of example 60, further comprising displaying, by the graphical user interface, the one or more attack paths and a risk score for each attack path to the enterprise.

Example 62. A computer-implemented method comprising:

generating a profile for an enterprise that indicates one or more software application stacks;

determining one or more vulnerability features of the one or more software application stacks;

generating one or more exploitability scores by a first machine learning model based at least in part on the one or more vulnerability features;

determining a proper subset of the one or more software application stacks based at least in part on the one or more exploitability scores;

determining one or more vulnerabilities of the proper subset of the one or more software application stacks;

providing the one or more vulnerabilities of the proper subset of the one or more software application stacks, the one or more exploitability scores, and/or the profile as input to a second machine learning model;

generating an inference by the second machine learning model that indicates one or more attack paths for an attacker in the proper subset of the one or more software application stacks; and transmitting the inference to a storage location or a security software application.

In yet another embodiment, an apparatus comprises a data storage device that stores code that when executed by a hardware processor causes the hardware processor to perform any method disclosed herein. An apparatus may be as described in the detailed description. A method may be as described in the detailed description.

Embodiments (e.g., of the mechanisms) disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices. For purposes of this application, a processing system includes any system that has a processor, such as, for example; a digital signal processor (DSP), a microcontroller, an application specific integrated circuit (ASIC), or a microprocessor.

The program code may be implemented in a high-level procedural or object-oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium. Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

What is claimed is:

1. A computer-implemented method comprising:

generating a profile for an enterprise that indicates one or more software application stacks and a network architecture for the one or more software application stacks;

determining one or more vulnerability features of the one or more software application stacks;

generating one or more exploitability scores by a first machine learning model based at least in part on the one or more vulnerability features;

determining a proper subset of the one or more software application stacks based at least in part on the one or more exploitability scores;

determining one or more vulnerabilities of the proper subset of the one or more software application stacks and one or more vulnerabilities of the network architecture;

providing the one or more vulnerabilities of the proper subset of the one or more software application stacks, the one or more vulnerabilities of the network architecture, and the profile as input to a second machine learning model;

generating an inference by the second machine learning model that indicates one or more attack paths for an attacker in the proper subset of the one or more software application stacks and the network architecture; and transmitting the inference to a storage location or a security software application.

2. The computer-implemented method of claim 1, wherein the determining the one or more vulnerability features further comprises determining one or more vulnerability features of the network architecture.

3. The computer-implemented method of claim 2, further comprising determining a proper subset of assets of the network architecture based at least in part on the one or more exploitability scores, wherein the determining the one or more vulnerabilities of the network architecture is determining the one or more vulnerabilities of the proper subset of assets of the network architecture, the providing the one or more vulnerabilities of the network architecture is providing the one or more vulnerabilities of the proper subset of assets of the network architecture, and the generating the inference by the second machine learning model indicates the one or more attack paths for the attacker in the proper subset of the one or more software application stacks and the proper subset of assets of the network architecture.

4. The computer-implemented method of claim 1, further comprising accessing threat intelligence data from one or more threat intelligence sources, wherein the determining the one or more vulnerability features of the one or more software application stacks is based at least in part on the threat intelligence data.

5. The computer-implemented method of claim 4, wherein the threat intelligence data comprises common vulnerabilities and exposures data.

6. The computer-implemented method of claim 4, wherein the common vulnerabilities and exposures data comprises common platform enumeration data, common weakness enumeration data, and common vulnerability scoring system data.

7. The computer-implemented method of claim 1, wherein the one or more vulnerability features comprise vulnerability characteristics, time-based exploitability, sources of exploitability, vendor metrics, and weakness metrics.

8. The computer-implemented method of claim 1, wherein the one or more vulnerability features comprise vulnerability characteristics, time-based exploitability, sources of exploitability, vendor metrics, or weakness metrics.

9. The computer-implemented method of claim 1, further comprising displaying, by a graphical user interface, the one or more vulnerabilities of the proper subset of the one or more software application stacks and a corresponding exploitability score.

10. The computer-implemented method of claim 9, further comprising displaying, by the graphical user interface, the one or more attack paths and a risk score for each attack path to the enterprise.

11. A computer-implemented method comprising:
generating a profile for an enterprise that indicates one or more software application stacks and a network architecture for the one or more software application stacks;
determining one or more vulnerability features of the one or more software application stacks;
generating one or more exploitability scores by a first machine learning model based at least in part on the one or more vulnerability features;
determining a proper subset of the one or more software application stacks based at least in part on the one or more exploitability scores;
determining one or more vulnerabilities of the proper subset of the one or more software application stacks and one or more vulnerabilities of the network architecture;
determining one or more anomalies within network traffic of the network architecture;
providing the one or more vulnerabilities of the proper subset of the one or more software application stacks, the one or more vulnerabilities of the network architecture, the one or more anomalies within the network traffic of the network architecture, and the profile as input to a second machine learning model;
generating an inference by the second machine learning model that indicates one or more attack paths for an attacker in the proper subset of the one or more software application stacks and the network architecture; and
transmitting the inference to a storage location or a security software application.

12. The computer-implemented method of claim 11, wherein the determining the one or more anomalies within the network traffic of the network architecture comprises inferring the one or more anomalies by a third machine learning model.

13. The computer-implemented method of claim 11, wherein the determining the one or more vulnerability features further comprises determining one or more vulnerability features of the network architecture.

14. The computer-implemented method of claim 13, further comprising determining a proper subset of assets of the network architecture based at least in part on the one or more exploitability scores, wherein the determining the one or more vulnerabilities of the network architecture is determining the one or more vulnerabilities of the proper subset of assets of the network architecture, the providing the one or more vulnerabilities of the network architecture is providing the one or more vulnerabilities of the proper subset of assets of the network architecture, and the generating the inference by the second machine learning model indicates the one or more attack paths for the attacker in the proper subset of the one or more software application stacks and the proper subset of assets of the network architecture.

15. The computer-implemented method of claim 11, further comprising accessing threat intelligence data from one or more threat intelligence sources, wherein the determining the one or more vulnerability features of the one or more software application stacks is based at least in part on the threat intelligence data.

16. The computer-implemented method of claim 15, wherein the threat intelligence data comprises common vulnerabilities and exposures data.

17. The computer-implemented method of claim 15, wherein the common vulnerabilities and exposures data comprises common platform enumeration data, common weakness enumeration data, and common vulnerability scoring system data.

18. The computer-implemented method of claim 11, wherein the one or more vulnerability features comprise vulnerability characteristics, time-based exploitability, sources of exploitability, vendor metrics, and weakness metrics.

19. The computer-implemented method of claim 11, wherein the one or more vulnerability features comprise vulnerability characteristics, time-based exploitability, sources of exploitability, vendor metrics, or weakness metrics.

20. The computer-implemented method of claim 11, further comprising displaying, by a graphical user interface, the one or more vulnerabilities of the proper subset of the one or more software application stacks and a corresponding exploitability score.

21. The computer-implemented method of claim 20, further comprising displaying, by the graphical user interface, the one or more attack paths and a risk score for each attack path to the enterprise.

\* \* \* \* \*